(12) United States Patent
Ito et al.

(10) Patent No.: US 10,447,909 B2
(45) Date of Patent: *Oct. 15, 2019

(54) LENS CONTROL APPARATUS, LENS CONTROL METHOD, IMAGE CAPTURING APPARATUS, INFORMATION PROCESSING APPARATUS, INFORMATION PROCESSING METHOD, IMAGE CAPTURING SYSTEM, AND COMPUTER READABLE STORAGE MEDIUM

(71) Applicant: Sony Corporation, Tokyo (JP)

(72) Inventors: Ryogo Ito, Tokyo (JP); Kazuma Akamatsu, Tokyo (JP); Megumi Takagi, Tokyo (JP); Shunsuke Katsumata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 15/203,548

(22) Filed: Jul. 6, 2016

(65) Prior Publication Data

US 2016/0316131 A1 Oct. 27, 2016

Related U.S. Application Data

(63) Continuation of application No. 14/249,689, filed on Apr. 10, 2014, now Pat. No. 9,420,188.
(Continued)

(51) Int. Cl.
*G02B 15/14* (2006.01)
*G02B 7/02* (2006.01)
(Continued)

(52) U.S. Cl.
CPC ......... *H04N 5/23206* (2013.01); *G02B 7/102* (2013.01); *G03B 5/00* (2013.01);
(Continued)

(58) Field of Classification Search
CPC .......... G02B 7/102; G02B 7/021; G02B 7/04; G02B 7/08; H04N 5/232; H04N 5/23248;
(Continued)

(56) References Cited

U.S. PATENT DOCUMENTS

| 6,686,967 B1 | 2/2004 | Yamamoto |
| 6,707,501 B1 | 3/2004 | McKay |

(Continued)

FOREIGN PATENT DOCUMENTS

| JP | 10-191141 A | 7/1998 |
| JP | 2001-4903 A | 1/2001 |

(Continued)

OTHER PUBLICATIONS

Extended European Search Report dated May 9, 2017 in Patent Application No. 14845578.5.
(Continued)

*Primary Examiner* — Dawayne Pinkney
(74) *Attorney, Agent, or Firm* — Oblon, McClelland, Maier & Neustadt, L.L.P.

(57) ABSTRACT

A lens control apparatus includes an operation input unit, a communication unit, and a control unit. The operation input unit is configured to accept a user operation. The communication unit is configured to perform communication with an external apparatus. The control unit is configured to perform driving control of a zoom lens in response to a zoom operation accepted by the operation input unit or a zoom control signal received by the communication unit. The control unit is also configured to selectively set a zoom position changing speed for driving control performed in response to the zoom operation and a zoom position changing speed for driving control performed in response to the zoom control signal, the zoom position changing speeds being different from each other.

20 Claims, 15 Drawing Sheets

Related U.S. Application Data

(60) Provisional application No. 61/878,986, filed on Sep. 17, 2013.

(51) Int. Cl.
    *G03B 17/00*     (2006.01)
    *H04N 5/262*     (2006.01)
    *H04N 5/232*     (2006.01)
    *G03B 5/00*     (2006.01)
    *G02B 7/10*     (2006.01)
    *G03B 17/02*     (2006.01)

(52) U.S. Cl.
CPC ......... *G03B 17/02* (2013.01); *H04N 5/23209* (2013.01); *H04N 5/23296* (2013.01); *G03B 2205/0046* (2013.01); *G03B 2206/00* (2013.01)

(58) Field of Classification Search
CPC ................. H04N 5/23296; G03B 5/00; G03B 2205/0046; G03B 17/38; G03B 7/091; G11B 7/0932; G11B 7/0935
USPC ..... 359/694–704, 808, 811–830; 396/56–59, 396/72, 76, 85–86; 348/208.6, 240.99, 348/240.1–240.3
See application file for complete search history.

(56) References Cited

U.S. PATENT DOCUMENTS

| | | |
|---|---|---|
| 2003/0025802 A1 | 2/2003 | Mayer, Jr. et al. |
| 2005/0190282 A1* | 9/2005 | Shibagami ......... H04N 5/23203 348/335 |
| 2006/0159439 A1* | 7/2006 | Furuya ................... G03B 15/03 396/86 |
| 2007/0025711 A1 | 2/2007 | Marcus |
| 2008/0240697 A1 | 10/2008 | Marcus |
| 2010/0321536 A1* | 12/2010 | Lee .................... H04N 1/00307 348/240.99 |
| 2012/0083313 A1 | 4/2012 | Marcus |
| 2013/0141640 A1 | 6/2013 | Kim et al. |

FOREIGN PATENT DOCUMENTS

| | | |
|---|---|---|
| JP | 2002-10244 A | 1/2002 |
| JP | 2002-354326 A | 12/2002 |
| JP | 2002-354329 A | 12/2002 |
| JP | 2006-40050 A | 2/2006 |
| JP | 2011-205345 | 10/2011 |
| JP | 2012-186698 | 9/2012 |
| JP | 2013-98636 | 5/2013 |
| JP | 2013-98636 A | 5/2013 |
| JP | 2014-220715 | 11/2014 |
| JP | 2014-220715 A | 11/2014 |

OTHER PUBLICATIONS

Combined Chinese Office Action and Search Report dated Oct. 26, 2017 in corresponding Patent Application No. 201480049772.2 (with English Translation), 14 pages.
Office Action dated Dec. 26, 2017 in corresponding Japanese Patent Application No. 2017-231484, citing document AO therein, 4 pages.
International Search Report completed Oct. 27, 2014, issued in PCT Application No. PCT/JP2014/070158, filed Jul. 31, 2014; 4 pages, (w/English Translation).
Written Opinion of ISA completed Oct. 27, 2014, issued in PCT Application No. PCT/JP2014/070158, filed Jul. 31, 2014; 8 pages, (w/English Translation).
International Search Report dated Nov. 4, 2014 in PCT/JP2014/070158 (with English Translation).
Office Action dated Apr. 23, 2019 in Japanese Patent Application No. 2018-126734 (with unedited computer generated English translation).
Japanese Office Action dated Oct. 3, 2017 in Patent Application No. 2015-537594 (with machine English translation).
Office Action dated Dec. 26, 2017 in corresponding Japanese Patent Application No. 2017-231484, 4 pages.
Office Action dated Feb. 27, 2018 in corresponding Japanese Patent Application No. 2017-231484, 3 pages (with machine English translation).
Office Action dated Mar. 6, 2018 in Japanese Patent Application No. 2015-537594 (with machine English translation).
Office Action dated May 1, 2018 in Japanese Patent Application No. 2017-231484 (with machine English translation).

\* cited by examiner

LENS CONTROL APPARATUS, LENS CONTROL METHOD, IMAGE CAPTURING APPARATUS, INFORMATION PROCESSING APPARATUS, INFORMATION PROCESSING METHOD, IMAGE CAPTURING SYSTEM, AND COMPUTER READABLE STORAGE MEDIUM

CROSS REFERENCE TO RELATED APPLICATION

This application is a continuation of U.S. application Ser. No. 14/249,689, filed Apr. 10, 2014, which claims the benefit of priority of Provisional Application Ser. No. 61/878,986, filed Sep. 17, 2013. The entire contents of which are incorporated herein by reference.

BACKGROUND

The present technology relates to a lens control apparatus, a lens control method, an image capturing apparatus, an information processing apparatus, an information processing method, an image capturing system, and a computer-readable storage medium, and enables a zooming action to be performed with excellent operability.

In the related art, image capturing apparatuses are capable of adjusting the angle of view by moving the zoom lens in response to operation of the zoom lever or zoom key. For example, in Japanese Unexamined Patent Application Publication No. 10-191141, manual zooming is implemented by electrically moving the zoom lens in response to movement of the zoom lever. Also, when movement of the zoom lens is controlled in accordance with pressure at which the zoom key is pressed, the zoom lever is electrically moved in accordance with the movement of the zoom lens so as to allow the user to roughly adjust the angle of view on the basis of the position of the zoom lever without viewing the screen.

Also, image capturing systems have been suggested in which an image capturing apparatus performs wireless communication with an external apparatus (e.g., an information processing apparatus), and an application having a function enabling remote control of the image capturing apparatus is caused to run in the information processing apparatus so as to allow the user to operate the image capturing apparatus from the information processing apparatus.

SUMMARY

Image capturing systems in which an image capturing apparatus is operated from an external apparatus via communication do not take into account a difference between the case where the image capturing apparatus is operated using an operation switch or the like included in the image capturing apparatus and the case where the image capturing apparatus is operated using the information processing apparatus.

In the case where the image capturing apparatus is operated using the information processing apparatus, the information processing apparatus, for example, detects the start of a zoom operation, and transmits a zooming start instruction to the image capturing apparatus. The information processing apparatus also detects the termination of the zoom operation, and transmits a zooming end instruction to the image capturing apparatus. The image capturing apparatus receives the zooming start instruction or the zooming end instruction, and controls a zooming action in accordance with the received instruction. In contrast, in the case where the image capturing apparatus is operated using an operation switch or the like included therein, the image capturing apparatus simply controls a zooming action in response to operation of the operation switch or the like. Consequently, the process takes longer when the image capturing apparatus is operated using the information processing apparatus than when the image capturing apparatus is operated using the operation switch or the like included therein, resulting in poor zooming stop responsiveness, for example. Poor zooming stop responsiveness may cause the actual zoom position (zooming stop position) to largely deviate from the zoom position selected when the user stops the zoom operation. For this reason, in the case where the zoom of the image capturing apparatus is operated using the information processing apparatus, the operation is desirably performed while taking into account poor responsiveness, for example, in order to set the zoom position to a desired position. This, however, possibly leads to a decrease in the operability.

Accordingly, the present technology provides a lens control apparatus, a lens control method, an image capturing apparatus, an information processing apparatus, an information processing method, an image capturing system, and a computer-readable storage medium that enable a zooming action to be performed with excellent operability either in the case where a zoom operation is performed in the image capturing apparatus or in the case where a zoom operation is performed in the external apparatus.

A first embodiment of the present technology provides a lens control apparatus including an operation input unit configured to accept a user operation, a communication unit configured to perform communication with an external apparatus, and a control unit configured to perform driving control of a zoom lens in response to a zoom operation accepted by the operation input unit or a zoom control signal received by the communication unit and configured to selectively set a zoom position changing speed for driving control performed in response to the zoom operation and a zoom position changing speed for driving control performed in response to the zoom control signal, the zoom position changing speeds being different from each other.

The lens control apparatus according to the embodiment of the present technology performs driving control of the zoom lens in response to a zoom operation accepted by the operation input unit or a zoom control signal received via wireless communication with the external apparatus via the communication unit. For example, the zoom position changing speed for driving control performed in response to the zoom control signal may be set to be lower than that for driving control performed in response to the zoom operation. Also, driving control in response to the zoom control signal may be started at a zoom position changing speed lower than that for driving control performed in response to the zoom operation and the zoom position changing speed may be later changed to the zoom position changing speed for driving control performed in response to the zoom operation. In the case where the zoom control signal indicates that a zoom operation has been performed in the external apparatus over a period shorter than a predetermined period, driving control may be performed over a preset period. Also, in the case where a target zoom position is indicated by the zoom control signal, the zoom position may be changed to the target zoom position indicated by the zoom control signal. In the case where a zoom position changing speed is indicated by the zoom control signal, the zoom position may be changed at the zoom position changing speed indicated by the zoom control signal. Further, information indicating the zoom position of the zoom lens may be transmitted to the external apparatus.

A second embodiment of the present technology provides a lens control method including performing, with a communication unit, communication with an external apparatus; performing, with a control unit, driving control of a zoom lens in response to a zoom operation accepted with an operation input unit or a zoom control signal received with the communication unit; and selectively setting, with the control unit, a zoom position changing speed for driving control performed in response to the zoom operation and a zoom position changing speed for driving control performed in response to the zoom control signal, the zoom position changing speeds being different from each other.

A third embodiment of the present technology provides a computer-readable storage medium storing a program causing a computer to execute a process for performing driving control of a zoom lens. The process includes performing, via a communication unit, communication with an external apparatus; performing driving control of the zoom lens in response to a zoom operation accepted with an operation input unit or a zoom control signal received via the communication unit; and selectively setting a zoom position changing speed for driving control performed in response to the zoom operation and a zoom position changing speed for driving control performed in response to the zoom control signal, the zoom position changing speeds being different from each other.

A fourth embodiment of the present technology provides an image capturing apparatus including an image capturing optical system including a zoom lens, an operation input unit configured to accept a user operation, a communication unit configured to perform communication with an external apparatus, and a control unit configured to perform driving control of the zoom lens in response to a zoom operation accepted by the operation input unit or a zoom control signal received by the communication unit and configured to selectively set a zoom position changing speed for driving control performed in response to the zoom operation and a zoom position changing speed for driving control performed in response to the zoom control signal, the zoom position changing speeds being different from each other.

A fifth embodiment of the present technology provides an information processing apparatus including a communication unit configured to perform communication with an image capturing apparatus, a display unit configured to display a captured image obtained from the image capturing apparatus via the communication unit, an operation input unit configured to accept a user operation, and a control unit configured to generate a zoom control signal for controlling a zooming action performed in the image capturing apparatus, in accordance with at least one of an operation position where a zoom operation is accepted by the operation input unit, duration of the zoom operation accepted by the operation input unit, and a movement distance over which the operation position of the zoom operation accepted by the operation input unit is moved and configured to output the generated zoom control signal to the image capturing apparatus via the communication unit.

In the information processing apparatus according to the embodiment of the present technology, a captured image is obtained from the image capturing apparatus via wireless communication and is displayed on the display unit. A zoom control signal for controlling a zooming action performed in the image capturing apparatus may be generated in accordance with the operation position of a user operation accepted by the operation input unit or the movement distance of the operation position, and may be output to the image capturing apparatus via the communication unit. For example, a zoom position changing period over which the zooming action is performed in the image capturing apparatus may be set in accordance with the movement distance of the operation position of a pinch operation. A target zoom position of the zooming action performed in the image capturing apparatus may be determined in accordance with the zoom position obtained from the image capturing apparatus and the movement distance of the operation position of the pinch operation. A zoom position changing speed of the zooming action performed in the image capturing apparatus may be determined in accordance with a movement speed of the operation position of the pinch operation.

A sixth embodiment of the present technology provides an information processing method including performing, with a communication unit, communication with an image capturing apparatus; displaying, with a display unit, a captured image obtained from the image capturing apparatus via the communication unit; generating, with a control unit, a zoom control signal for controlling a zooming action performed in the image capturing apparatus, in accordance with at least one of an operation position where a zoom operation is accepted with an operation input unit, duration of the zoom operation accepted with the operation input unit, and a movement distance over which the operation position of the zoom operation accepted with the operation input unit is moved; and outputting, with the control unit, the generated zoom control signal to the image capturing apparatus via the communication unit.

A seventh embodiment of the present technology provides a computer-readable storage medium storing a program causing a computer to execute a process for triggering driving control of a zoom lens included in an image capturing apparatus. The process includes performing, via a communication unit, communication with the image capturing apparatus; generating a zoom control signal for controlling a zooming action performed in the image capturing apparatus in response to a zoom operation accepted with an operation input unit; and outputting the generated zoom control signal to the image capturing apparatus via the communication unit. A zoom position changing speed for zoom driving control performed in response to a zoom operation accepted with an operation input unit included in the image capturing apparatus and a zoom position changing speed for zoom driving control performed in response to the zoom control signal are set to be different.

An eighth embodiment of the present technology provides an image capturing system including an image capturing apparatus and an information processing apparatus. The image capturing apparatus includes an image capturing optical system including a zoom lens, an operation input unit configured to accept a user operation, a communication unit configured to perform communication with the information processing apparatus, and a control unit configured to perform driving control of the zoom lens in response to a zoom operation accepted by the operation input unit included in the image capturing apparatus or a zoom control signal received by the communication unit included in the image capturing apparatus. The information processing apparatus includes a communication unit configured to perform communication with the image capturing apparatus, an operation input unit configured to accept a user operation, and a control unit configured to generate a zoom control signal for controlling a zooming action performed in the image capturing apparatus, in response to a zoom operation accepted by the operation input unit included in the information processing apparatus and configured to output the generated zoom control signal to the image capturing apparatus via the communication unit included in the information processing apparatus. A zoom position changing speed for driving control performed in response to the zoom operation and a zoom position changing speed for driving control performed in response to the zoom control signal are set to be different by the control unit included in the image capturing apparatus.

Note that the programs according to the embodiments of the present technology may be provided to, for example, a general-purpose computer capable of executing various program codes by using a computer-readable storage medium, for example, an optical disc, a magnetic disk, or a semiconductor memory, or a communication medium, such as a network. By providing such programs in a computer-readable format, processes based on the programs are implemented in the computer.

According to the embodiments of the present technology, driving control of the zoom lens is performed in response to a zoom operation accepted by the operation input unit or a zoom control signal received by the communication unit and different zoom position changing speeds are set for driving control performed in response to the zoom operation and driving control performed in response to the zoom control signal. Accordingly, the zoom position changing speed is switched between the one suitable for a zoom operation accepted by the operation input unit and the one suitable for the zoom control signal, that is, a zoom operation performed in the external apparatus. This configuration consequently enables a zooming operation to be performed with excellent operability when a zoom operation is performed either in the image capturing apparatus or in the external apparatus. Benefits described herein are merely illustrative and should not be construed as limitations and there may be additional benefits.

DETAILED DESCRIPTION OF EMBODIMENTS

Embodiments for carrying out the present technology will be described below. The description will be given in the following order.
1. Configuration of Image Capturing System
   1-1. Appearance of Image Capturing System
   1-2. Functional Configuration of Image Capturing Apparatus
   1-3. Functional Configuration of Information Processing Apparatus
2. Actions of Image Capturing System
   2-1. Cooperation between Image Capturing Apparatus and Information Processing Apparatus
   2-2. Zooming Action of Image Capturing Apparatus
   2-3. Zooming Control Action of Information Processing Apparatus
3. Other Actions of Image Capturing System
   3-1. Other Actions of Image Capturing Apparatus
   3-2. Other Actions of Information Processing Apparatus
1. Configuration of Image Capturing System An image capturing system includes an image capturing apparatus and an information processing apparatus. The image capturing apparatus has, for example, a zoom function, and thus is capable of generating image information of a still image or movie of a desired angle of view. The image capturing apparatus also has a wireless communication function, and thus is capable of performing wireless communication with the information processing apparatus. The image capturing apparatus performs an action in accordance with a control signal supplied from the information processing apparatus via wireless communication. The image capturing apparatus also outputs various pieces of information to the information processing apparatus via wireless communication.

The information processing apparatus has a display function and a wireless communication function. For example, a mobile phone, a smartphone, a tablet terminal, or a notebook computer may be used as the information processing apparatus. The information processing apparatus generates a control signal for operating the image capturing apparatus, and outputs the generated control signal to the image capturing apparatus via wireless communication. The information processing apparatus also processes information supplied from the image capturing apparatus via wireless communication. For example, the information processing apparatus displays a captured image on the basis of image information supplied from the image capturing apparatus.

1-1. Appearance of Image Capturing System

Figure 1:
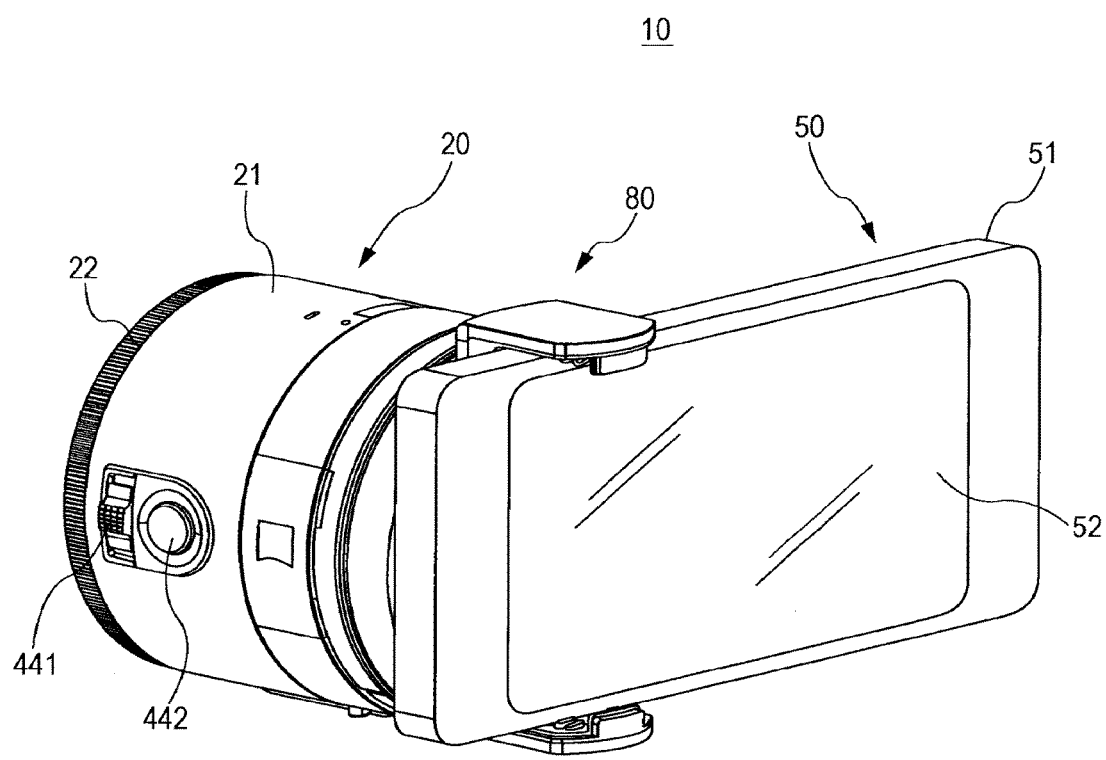
FIG. 1 is a diagram illustrating the appearance (rear side) of an image capturing system.
Figure 2:
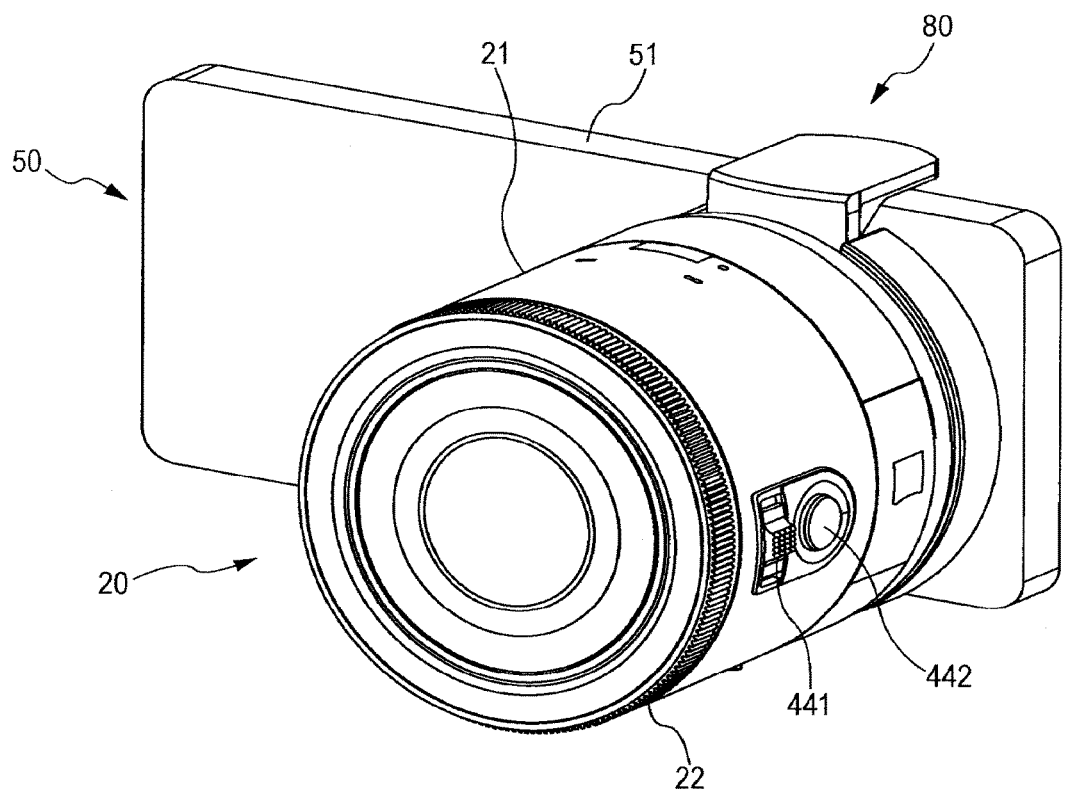
FIG. 2 is a diagram illustrating the appearance (front side) of the image capturing system.

FIGS. 1 and 2 illustrate the appearance of the image capturing system according to an embodiment of the present technology. Specifically, FIG. 1 illustrates the rear side of the image capturing system and FIG. 2 illustrates the front side of the image capturing system. Also, a smartphone, for example, is used as the information processing apparatus.

An image capturing system 10 includes an image capturing apparatus 20 and an information processing apparatus 50 (e.g., a smartphone).

The image capturing apparatus 20 includes an image capturing optical system block, an image capturing unit, a signal processing unit, a communication unit, and a camera control unit (which are not illustrated) inside an outer cylinder 21 having a cylindrical shape. At a front end of the outer cylinder 21, a control ring 22 having a circular shape is provided. The image capturing apparatus 20 changes the in-focus position or the zoom position in response to rotation of the control ring 22. Accordingly, the use of the control ring 22 enables manual operation such as focus adjustment. On a lateral face of the outer cylinder 21, a zoom button 441 and a shutter button 442 are provided. The image capturing apparatus 20 changes the zoom position to the wide-angle side or the telephoto side at a predetermined speed in response to operation of the zoom button 441. In a still image mode, the image capturing apparatus 20 records a still image captured when the user operates the shutter button 442 on a recording medium. In a movie mode, the image capturing apparatus 20 starts or ends recording a movie in response to operation of the shutter button 442.

The information processing apparatus 50 includes a signal processing unit, a communication unit, and a control unit (which are not illustrated) inside an outer casing 51 having a substantially rectangular parallelepiped shape. On a face (rear face) of the outer casing 51, a display panel 52 which is a touch screen is provided. Various functions are carried out in response to operations performed at predetermined positions of the display panel 52.

Figure 3:
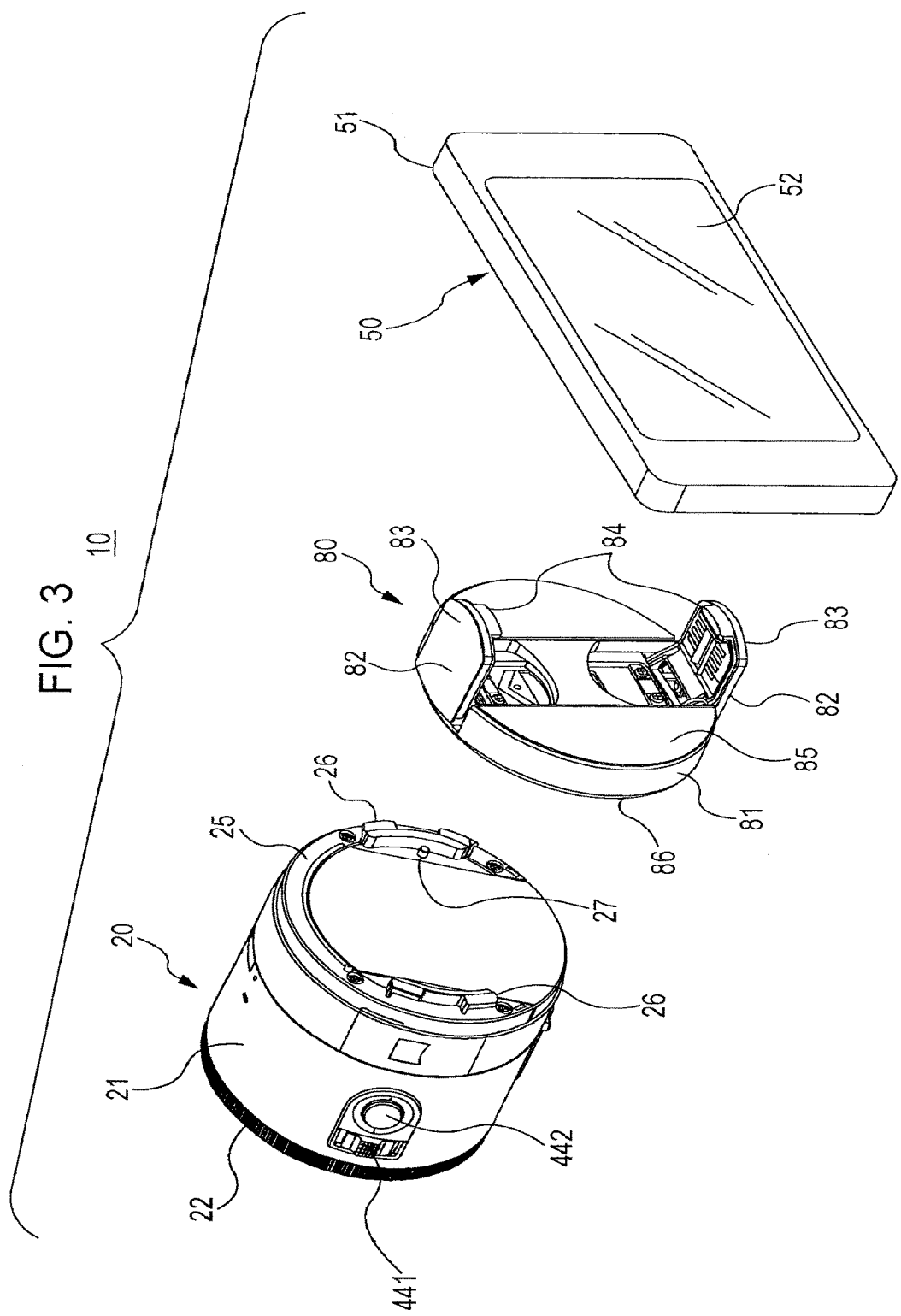
FIG. 3 is a diagram illustrating the case where an image capturing apparatus and an information processing apparatus are integrated using an adapter.

In the image capturing system 10, the image capturing apparatus 20 and the information processing apparatus 50 are not necessarily used in an integrated state as illustrated in FIGS. 1 and 2 and may be used in a separated state. Note that FIG. 3 illustrates the case where the image capturing apparatus 20 and the information processing apparatus 50 are integrated using an adapter 80.

To a rear end of the image capturing apparatus 20, a rear panel 25 having a disc shape is attached. At an outer periphery of the rear panel 25, connectors 26 protruding toward the rear side are provided. The rear panel 25 supports lock pins 27 in such a manner that the lock pins 27 are movable forward and backward. The lock pins 27 are urged by urging members (not illustrated) toward the rear side. The image capturing apparatus 20 also includes an unlock lever (not illustrated). Operation of the unlock lever causes the lock pins 27 to be drawn into the rear panel 25.

The adapter 80 includes a casing 81 having a cylindrical shape and a size corresponding to the outer cylinder 21 of the image capturing apparatus 20. At an end of the casing 81, two attachments 82 are rotationally provided so as to stand from a first opposing face 85 of the casing 81 opposing the information processing apparatus 50. The attachments 82 are each urged by an urging member in a direction from the standing position to the folded position. The attachments 82 each include a clamping portion 83 having a substantially planar shape and a retaining projection 84 protruding from an end of the clamping portion 83 toward the center. A second opposing face 86 of the casing 81 opposing the image capturing apparatus 20 has thereon connector recesses (not illustrated) into which the connectors 26 of the image capturing apparatus 20 are inserted and lock holes (not illustrated) into which the lock pins 27 are inserted.

When connecting the image capturing apparatus 20 to the adapter 80, the user inserts the connectors 26 of the image capturing apparatus 20 into the connector recesses of the adapter 80, and then rotates the image capturing apparatus 20 in a predetermined direction. Consequently, the connectors 26 are secured in the connector recesses. When the connectors 26 are secured in the connector recesses, the lock pins 27 are in the lock holes. Accordingly, the image capturing apparatus 20 and the adapter 80 are locked in the connected state. When separating the image capturing apparatus 20 from the adapter 80, the user operates the unlock lever, and then rotates the image capturing apparatus 20 in a direction opposite to the predetermined direction. The lock pins 27 are removed from the lock holes as a result of operation of the unlock lever. In this state, the image capturing apparatus 20 is rotated in the opposite direction. As a result, the connectors 26 are no longer secured in the connector recesses. In this way, the image capturing apparatus 20 is separated from the adapter 80.

When connecting the adapter 80 to the information processing apparatus 50, the user makes the attachments 82 of the adapter 80 stand from the first opposing face 85. The user also adjusts the space between the attachments 82 to a width corresponding to the outer casing 51 of the information processing apparatus 50 so as to cause the clamping portions 83 of the attachments 82 to clamp the outer casing 51 therebetween. The retaining projections 84 are secured on the rear face (on the display panel side) of the outer casing 51. In this way, the adapter 80 is connected to the information processing apparatus 50. The information processing apparatus 50 is separated from the adapter 80 by canceling the clamping state achieved by the clamping portions 83 and the secured state achieved by the retaining projections 84.

As described above, the use of the image capturing apparatus 20, the information processing apparatus 50, and the adapter 80 permits the image capturing apparatus 20 and the information processing apparatus 50 to be used in the integrated state or in the separated state. Note that the configuration of the adapter 80 is not limited to the one illustrated in FIG. 3 and may be another configuration. Also, the image capturing apparatus 20 and the information processing apparatus 50 may be made integral with each other or separable from each other without using the adapter 80.

1-2. Functional Configuration of Image Capturing Apparatus

Figure 4:
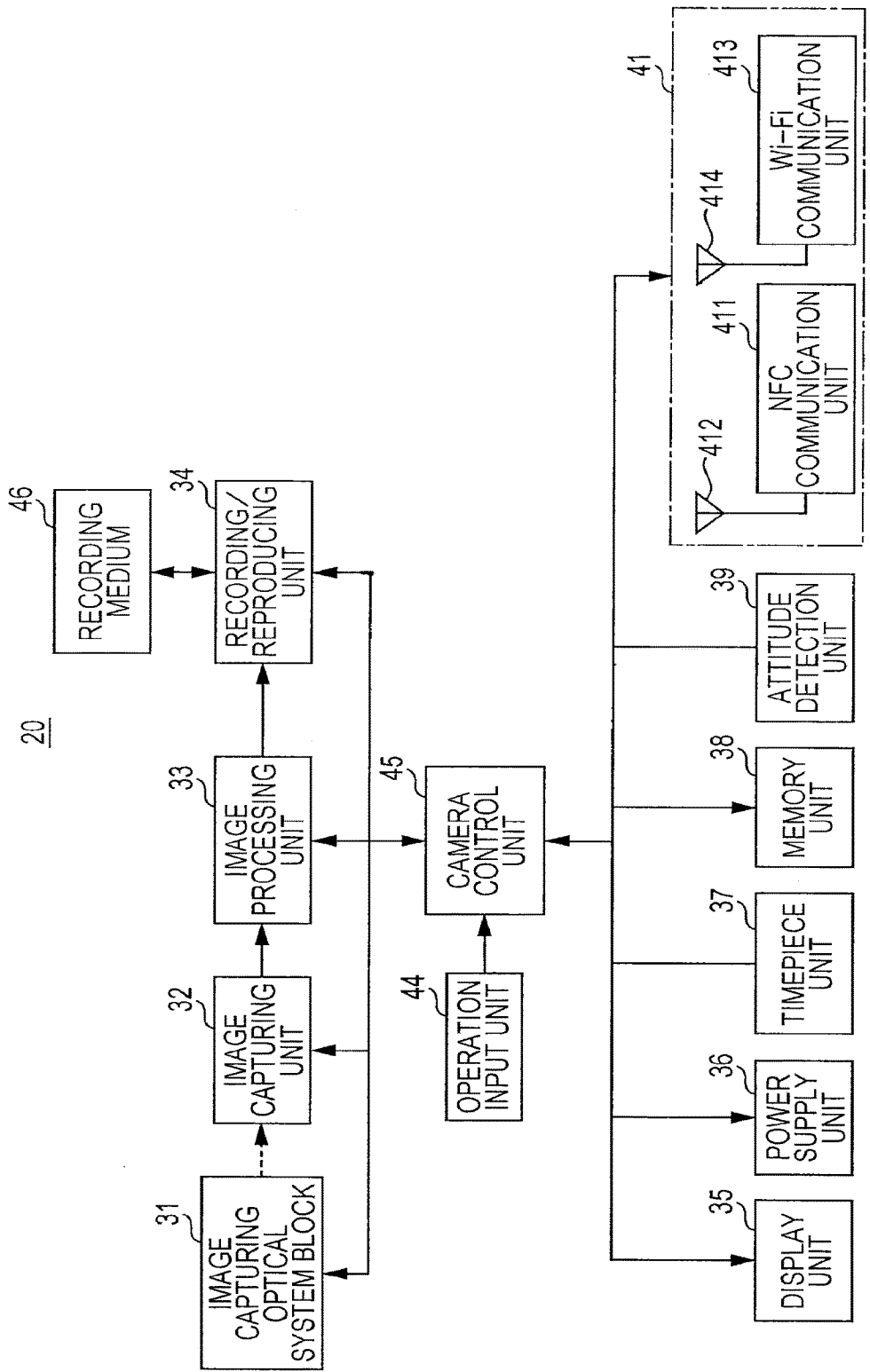
FIG. 4 is a block diagram illustrating the functional configuration of the image capturing apparatus.

Next, the functional configuration of the image capturing apparatus 20 will be described. FIG. 4 is a block diagram illustrating the functional configuration of the image capturing apparatus 20.

As illustrated in FIG. 4, the image capturing apparatus 20 includes an image capturing optical system block 31, an image capturing unit 32, an image processing unit 33, a recording/reproducing unit 34, a display unit 35, a power supply unit 36, a timepiece unit 37, a memory unit 38, an attitude detection unit 39, a wireless communication unit 41, an operation input unit 44, and a camera control unit 45. The image capturing apparatus 20 also includes a recording medium 46 which is removable therefrom.

The image capturing optical system block 31 includes a set of lenses such as a focus lens and a zoom lens, an aperture adjusting mechanism, and driving units for driving the set of lenses and the aperture adjusting mechanism. The image capturing optical system block 31 may further include a shutter mechanism and a blurring correction mechanism.

The image capturing unit 32 includes an imaging device, such as a charge coupled device (CCD) imaging device or a complementary metal oxide semiconductor (CMOS) imaging device. The image capturing unit 32 converts an optical image of a subject formed by the image capturing optical system block 31 into an image signal. The image capturing unit 32 outputs the image signal generated through photoelectric conversion to the image processing unit 33.

The image processing unit 33 performs various types of signal processing or the like on the image signal output from the image capturing unit 32. For example, the image processing unit 33 performs processing, such as noise reduction, tone correction, and edge detection, if necessary. The image processing unit 33 outputs the resulting image signal to the recording/reproducing unit 34.

The recording/reproducing unit 34 performs, using the recording medium 46, recording of a captured image and reproduction of a recorded captured image. Specifically, the recording/reproducing unit 34 records an image signal of a still image or movie that has been generated by the image capturing unit 32 and has been processed by the image processing unit 33, on the recording medium 46. The recording/reproducing unit 34 reproduces a still image or movie recorded on the recording medium 46 and reads out the corresponding image signal from the recording medium 46. Note that the recording/reproducing unit 34 may record an image signal not yet processed by the image processing unit 33 on the recording medium 46. The recording/reproducing unit 34 may perform encoding processing to reduce the size of an image signal to be recorded on the recording medium 46 and decoding processing to decode encoded data recorded on the recording medium 46.

The display unit 35 includes, for example, a liquid crystal display. The display unit 35 displays a captured image or information representing settings or the operating state of the image capturing apparatus 20. The power supply unit 36 includes a battery and a power supply circuit. The power supply unit 36 supplies power to each component of the image capturing apparatus 20 in accordance with a control signal output from the camera control unit 45. The timepiece unit 37 keeps the time and outputs time information indicating the current time to the recording/reproducing unit 34 so as to enable a captured image to be recorded together with the capturing time.

The memory unit 38 includes recording media, such as a random access memory (RAM) and a read only memory (ROM). The RAM is used by the camera control unit 45 as a work area, for example. The ROM stores programs or the like causing the camera control unit 45 to perform various kinds of control, for example. The RAM and the ROM store control information or the like used by the camera control unit 45 to perform various kinds of control.

The attitude detection unit 39 detects the attitude of or the change in the attitude of the image capturing apparatus 20. The attitude detection unit 39 includes a gravity sensor, a gyro sensor, or a 3-axis acceleration sensor. The attitude detection unit 39 detects the change in the attitude of the image capturing apparatus 20 in the vertical and horizontal directions, or the rotation position of or the change in the rotation position of the image capturing apparatus 20 with respect to a rotation axis which is the optical axis of the image capturing optical system block 31. The attitude detection unit 39 outputs an attitude detection signal to the camera control unit 45. Outputting the image signal of a captured image together with the attitude detection signal to the information processing apparatus 50 enables the captured image to be displayed while taking the attitude of the image capturing apparatus 20 into account. For example, when a captured image is generated in a state where the image capturing apparatus 20 is tilted with respect to the horizontal direction, a subject that is not tilted with respect to the horizontal direction is displayed to be tilted with respect to the horizontal direction in the information processing apparatus 50. However, by correcting the tilt using the attitude detection signal, the subject that is not tilted with respect to the horizontal direction is correctly displayed in the non-tilted state.

The wireless communication unit 41 includes a Near Filed Communication (NFC) communication unit 411, an NFC antenna 412, a Wireless Fidelity (Wi-Fi) communication unit 413, and a Wi-Fi antenna 414.

The NFC communication unit 411 is an interface that enables, together with the NFC antenna 412, non-contact communication with an external apparatus (for example, the information processing apparatus 50) located near the image capturing apparatus 20, under control of the camera control unit 45. The NFC communication unit 411 transmits, from the NFC antenna 412, a radio wave that reaches up to a position that is approximately 3 to 10 centimeters away or, depending on its design, approximately 7 millimeters away from the NFC antenna 412, so as to perform NFC communication with an external apparatus located within the reachable range of the radio wave. The NFC communication unit 411 transmits, for example, connection information (Wi-Fi Configuration) used to automatically establish a Wi-Fi connection and Android Application Record (AAR), in response to a check command received from an external apparatus. The connection information includes a service set identifier (SSID) and a pass key (encryption key) used to establish a Wi-Fi connection.

The Wi-Fi communication unit 413 is an interface that enables, together with the Wi-Fi antenna 414, wireless communication with an external apparatus (for example, the information processing apparatus 50), under control of the camera control unit 45. For example, the Wi-Fi communication unit 413 performs Wi-Fi authentication in response to a Wi-Fi connection request received from an external apparatus so as to establish a Wi-Fi communication connection to the external apparatus.

The operation input unit 44 detects an operation input by a user and outputs an operation signal corresponding to the user operation to the camera control unit 45. The operation input unit 44 includes the zoom button 441 and the shutter button 442. Each physical switch is pre-assigned a corresponding function.

The camera control unit 45 executes programs recorded in the memory unit 38 so as to generate control signals based on operation signals supplied from the operation input unit 44 or control information or the like stored in the memory unit 38. The camera control unit 45 outputs each of the generated control signals to a corresponding component so as to perform image capturing control, image processing control, or recording/reproduction control so that an action corresponding to the user operation is performed in the image capturing apparatus 20. The camera control unit 45 also controls the NFC communication unit 411 and the Wi-Fi communication unit 413 included in the wireless communication unit 41 so as to perform wireless communication with the information processing apparatus 50, and performs zoom driving control on the basis of a zoom control signal supplied from the information processing apparatus 50. When performing zoom driving control in accordance with a zoom operation accepted by the operation input unit 44 or a zoom control signal received by the wireless communication unit 41, the camera control unit 45 sets different zoom position changing speeds for zoom driving control performed in response to a zoom operation accepted by the operation input unit 44 and for zoom driving control performed in response to a zoom control signal.

The recording medium 46, such as a memory card on which captured images or the like are recorded, is removable.

1-3. Functional Configuration of Information Processing Apparatus

Figure 5:
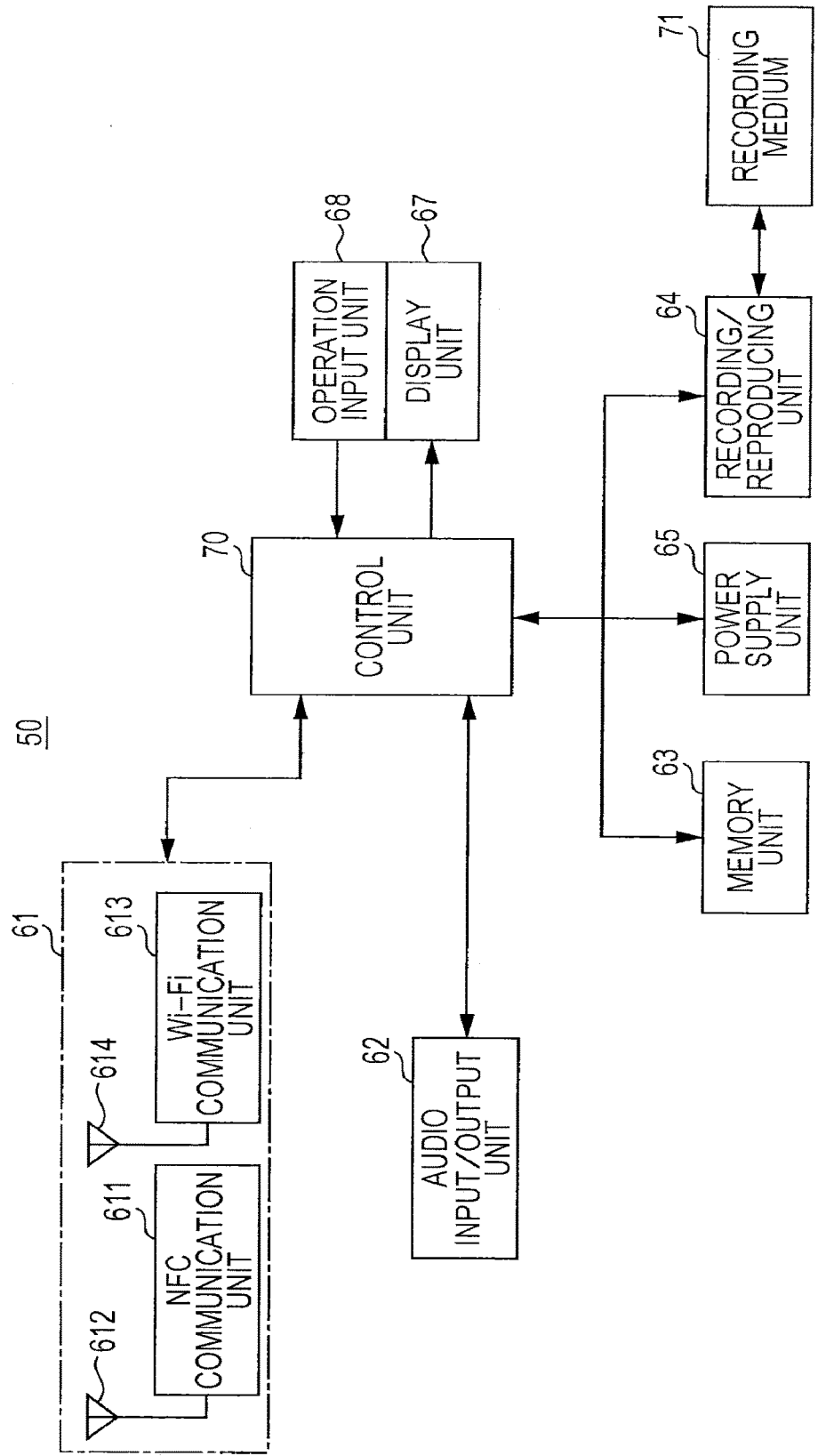
FIG. 5 is a block diagram illustrating the functional configuration of the information processing apparatus (e.g., a smartphone)

Next, the functional configuration of the information processing apparatus 50 will be described. FIG. 5 is a block diagram illustrating the functional configuration of the information processing apparatus 50 (for example, a smartphone).

As illustrated in FIG. 5, the information processing apparatus 50 includes a wireless communication unit 61, an audio input/output unit 62, a memory unit 63, a recording/reproducing unit 64, a power supply unit 65, a display unit 67, an operation input unit 68, and a control unit 70. The information processing apparatus 50 also includes a recording medium 71 which is removable therefrom.

The wireless communication unit 61 includes an NFC communication unit 611, an NFC antenna 612, a Wi-Fi communication unit 613, and a Wi-Fi antenna 614. Note that the wireless communication unit 61 may further include a communication unit (not illustrated) compliant with the cellular phone communication standard.

The NFC communication unit 611 is an interface that enables, together with the NFC antenna 612, non-contact communication with an external apparatus (for example, the image capturing apparatus 20) located near the information processing apparatus 50, under control of the control unit 70. The NFC communication unit 611 performs NFC communication with, for example, the image capturing apparatus 20 as described above.

The Wi-Fi communication unit 613 is an interface that enables, together with the Wi-Fi antenna 614, wireless communication with an external apparatus (for example, the image capturing apparatus 20), under control of the control unit 70. The Wi-Fi communication unit 613 establishes a Wi-Fi communication connection to, for example, the image capturing apparatus 20 as described above.

The audio input/output unit 62 includes a speaker and a microphone. The audio input/output unit 62 receives and outputs audio of a voice call carried out via the wireless communication unit 61. The audio input/output unit 62 also outputs reproduced sound of music content or movie content recorded in the memory unit 63 or on the recording medium 71.

The memory unit 63 includes recording media, such as a RAM and a ROM. The RAM is used by the control unit 70 as a work area, for example. The ROM stores programs or the like causing the control unit 70 to perform various kinds of control, for example. The RAM and the ROM store control information or the like used by the control unit 70 to perform various kinds of control. The RAM may further store music content, movie content, various application programs, captured images supplied from the image capturing apparatus 20, mail information, and so forth.

The recording/reproducing unit 64 performs, using the recording medium 71, recording and readout of various pieces of information. Specifically, the recording/reproducing unit 64 records, for example, music content, movie content, captured images, mail information, and address information of other people used for wireless communication, on the recording medium 71. The recording/reproducing unit 64 also reads out various pieces of information recorded on the recording medium 71.

The power supply unit 65 includes a battery and a power supply circuit. The power supply unit 65 supplies power to each component of the information processing apparatus 50.

The display unit 67 includes a display element, such as a liquid crystal display or an organic electroluminescence (EL) display. The display unit 67 displays graphical user interface (GUI) screens, text and images based on actions of applications, and so forth, under control of the control unit 70.

The operation input unit 68 includes operation switches and a touch screen. The touch screen is disposed on a display screen of the display unit 67. Each item displayed on the display screen is assigned a corresponding function. The operation input unit 68 generates an operation signal corresponding to a user operation, and outputs the generated operation signal to the control unit 70. Note that the display panel 52 is constituted by the display unit 67 and the operation input unit 68.

The control unit 70 executes programs recorded in the memory unit 63 so as to generate control signals based on operation signals supplied from the operation input unit 68 or control information or the like stored in the memory unit 63. The control unit 70 also outputs each of the generated control signals to a corresponding component so as to perform communication control, display control, and recording/reproduction control so that an action corresponding to the user operation is performed in the information processing apparatus 50. The control unit 70 also controls the NFC communication unit 611 and the Wi-Fi communication unit 613 so as to perform wireless communication with the image capturing apparatus 20. The control unit 70 further starts a certain application program on the basis of communication with the image capturing apparatus 20. After the startup of the program, the control unit 70 generates a zoom control signal for controlling a zooming action of the image capturing apparatus 20, in accordance with at least one of an operation position where a zoom operation is performed, duration of the zoom operation, and a movement distance of the operation position based on an operation signal. The control unit 70 then transmits the generated zoom control signal to the image capturing apparatus 20.

Figure 6:
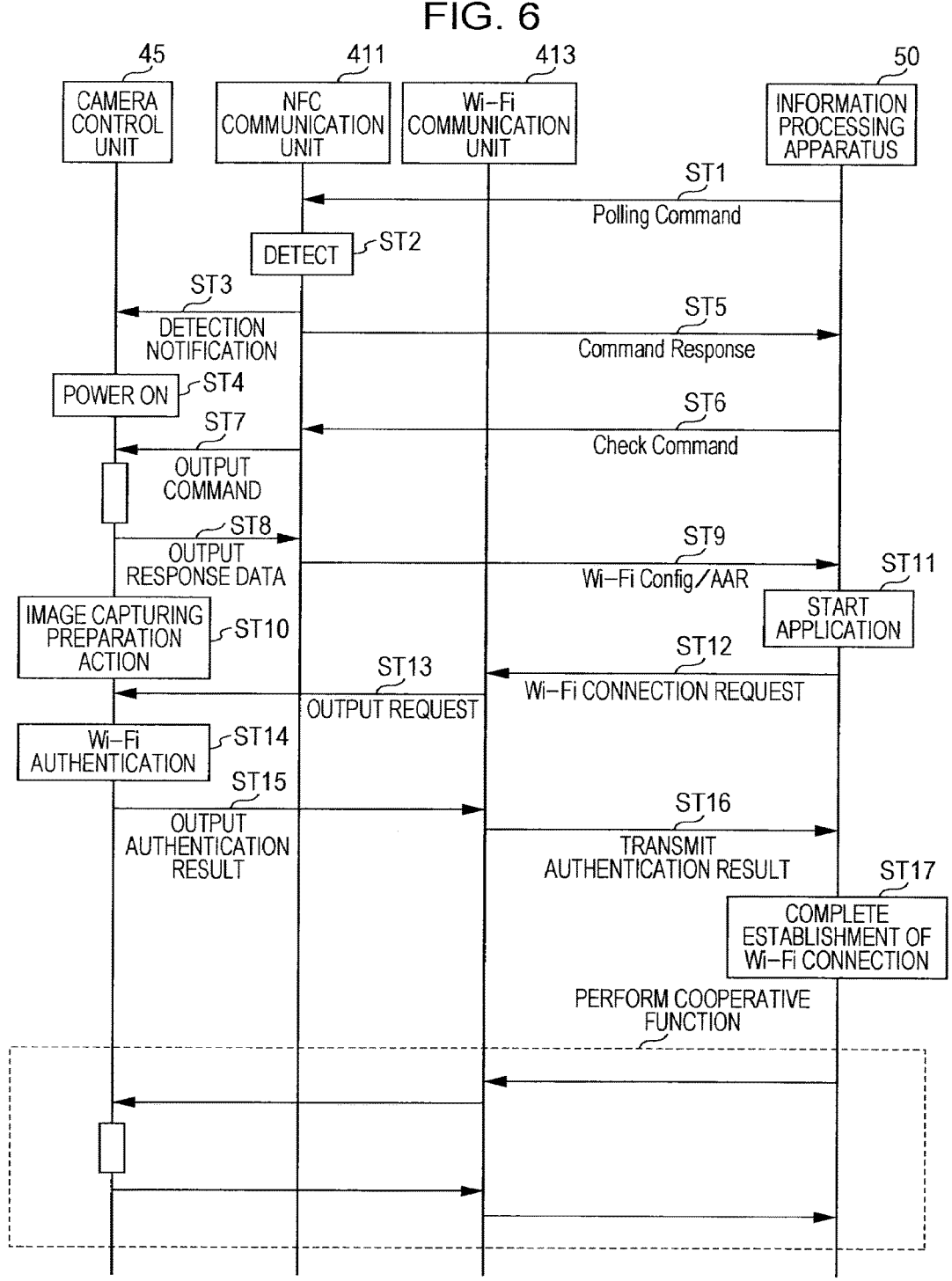
FIG. 6 is a sequence diagram illustrating a process performed before a cooperative function is started between the image capturing apparatus and the information processing apparatus.

2. Actions of Image Capturing System 2-1. Cooperation Between Image Capturing Apparatus and Information Processing Apparatus Next, actions of the image capturing system 10 will be described. FIG. 6 is a sequence diagram illustrating a process performed before a cooperative function is started between the image capturing apparatus 20 and the information processing apparatus 50 in the image capturing system 10.

In step ST1, the information processing apparatus 50 issues a polling command via NFC communication. At this time, if the NFC antenna 412 of the image capturing apparatus 20 is located within a predetermined radio wave reachable range from the NFC antenna 612 of the information processing apparatus 50, the NFC communication unit 411 of the image capturing apparatus 20 detects the issued polling command in step ST2.

Upon detecting NFC communication from the information processing apparatus 50, the NFC communication unit 411 of the image capturing apparatus 20 notifies the camera control unit 45 of detection in step ST3.

In response to the detection notification made by the NFC communication unit 411, the camera control unit 45 generates a control signal, and outputs the control signal to the power supply unit 36 so as to perform power-on control in step ST4.

Upon detecting the NFC communication, the NFC communication unit 411 issues a command response via NFC communication in step ST5.

In step ST6, the information processing apparatus 50 detects the command response issued from the image capturing apparatus 20, thereby discovering the NFC communication counterpart, and then issues a check command in order to obtain predetermined information.

In step ST7, the NFC communication unit 411 of the image capturing apparatus 20 outputs the check command received via NFC communication to the camera control unit 45.

In response to the check command, the camera control unit 45 outputs response data to the NFC communication unit 411 in step ST8. This response data includes, for example, Wi-Fi Configuration and AAR mentioned above.

In step ST9, the NFC communication unit 411 transmits the response data to the information processing apparatus 50 via NFC communication. Note that the response data may be transmitted in a divided manner by performing steps ST6 to ST9 multiple times.

In step ST10, the camera control unit 45 performs an image capturing preparation action. Specifically, the camera control unit 45 performs a preparation action so as to make the image capturing apparatus 20 be ready for image capturing. Here, the preparation action may be performed, so that the state in which the image capturing apparatus 20 is ready for image capturing is identifiable. For example, in the case where a collapsible lens is used as the image capturing optical system block 31, the camera control unit 45 performs an action to bring the lens out or to output activation sound. Note that the image capturing preparation action may be performed after a Wi-Fi connection is established.

In step ST11, the information processing apparatus 50 starts a predetermined application in accordance with the received AAR. For example, the predetermined application receives an image signal of a captured image transmitted from the image capturing apparatus 20 via Wi-Fi communication and displays the captured image.

In step ST12, the information processing apparatus 50 uses the received Wi-Fi configuration so as to transmit a Wi-Fi connection request to the image capturing apparatus 20.

In step ST13, the Wi-Fi communication unit 413 of the image capturing apparatus 20 outputs the connection request received from the information processing apparatus 50 to the camera control unit 45.

In step ST14, the camera control unit 45 performs Wi-Fi authentication. Note that Wi-Fi authentication may be performed by the Wi-Fi communication unit 413.

In step ST15, the camera control unit 45 outputs the authentication result to the Wi-Fi communication unit 413.

In step ST16, the Wi-Fi communication unit 413 transmits the authentication result to the information processing apparatus 50. In step ST17, the information processing apparatus 50 completes establishment of a Wi-Fi connection as a result of successful authentication. Thereafter, the image capturing apparatus 20 and the information processing apparatus 50 carry out a cooperative function using Wi-Fi communication.

Note that the image capturing apparatus 20 and the information processing apparatus 50 are made at least operate in cooperation with each other via Wi-Fi communication or the like. Thus, a procedure performed before a cooperative function is started between the image capturing apparatus 20 and the information processing apparatus 50 is not limited to the procedure illustrated in FIG. 6.

2-2. Zooming Action of Image Capturing Apparatus

Next, a description will be given of a zooming action performed by the image capturing apparatus 20 in the case where a cooperative function is enabled between the image capturing apparatus 20 and the information processing apparatus 50.

Figure 7:
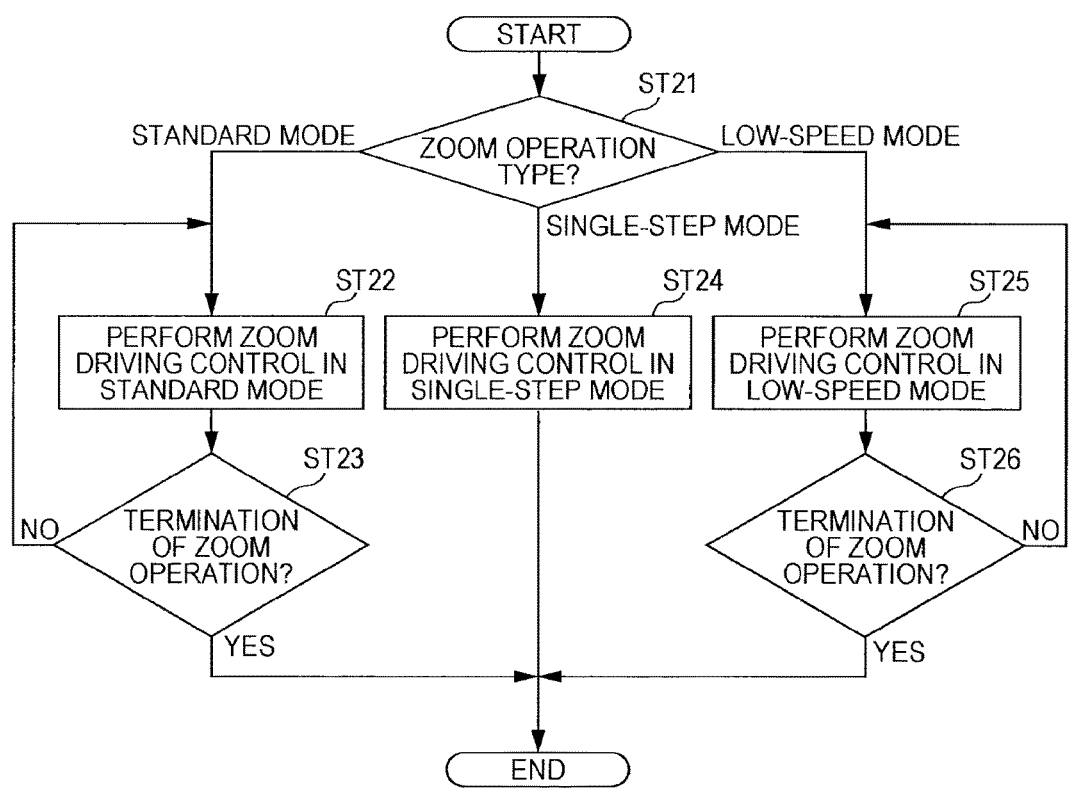
FIG. 7 is a flowchart illustrating an action performed by the image capturing apparatus.

The camera control unit 45 of the image capturing apparatus 20 performs a process illustrated in FIG. 7 upon detecting operation of the zoom button 441 on the basis of an operation signal supplied from the operation input unit 44 or upon detecting a zoom control signal supplied from the information processing apparatus 50 via Wi-Fi communication.

FIG. 7 is a flowchart illustrating an action performed by the image capturing apparatus 20. In step ST21, the camera control unit 45 identifies a zoom operation type indicated by a zoom request. If the camera control unit 45 determines that the zoom request is made using the zoom button 441 provided on the image capturing apparatus 20, the process proceeds to step ST22. If the camera control unit 45 determines that the zoom request is made by the information processing apparatus 50 and specifies zoom driving control performed for a predetermined period, the process proceeds to step ST24. If the camera control unit 45 determines that the zoom request is made by the information processing apparatus 50 and is an instruction to start zoom driving control, the process proceeds to step ST25. Note that the zoom request specifies whether the zoom position is to be changed to the wide-angle side or the telephoto side on the basis of the user operation.

Figure 8:
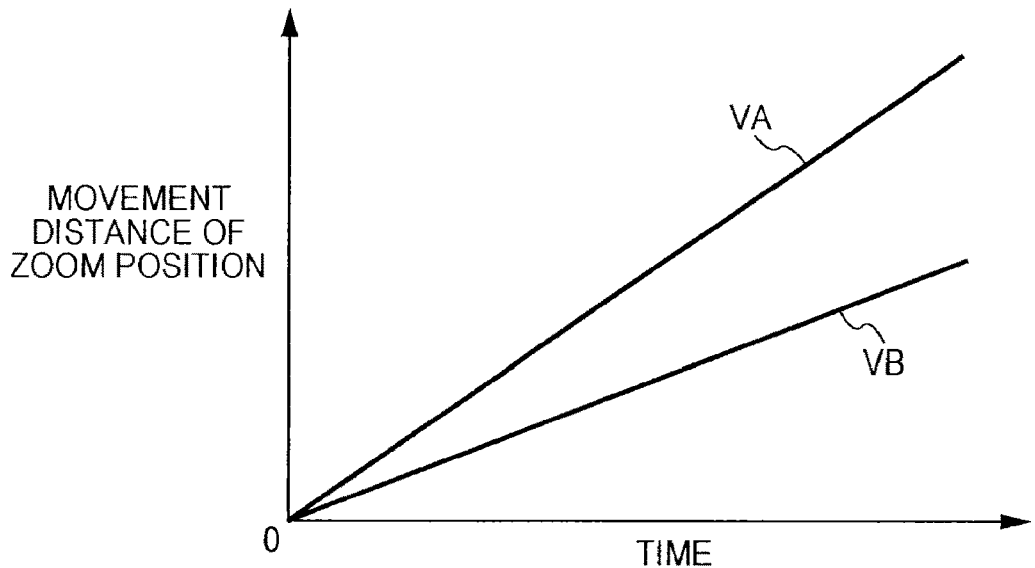
FIG. 8 is a diagram illustrating characteristics regarding how the zoom position is changed.

In step ST22, the camera control unit 45 performs zoom driving control in a standard mode. Specifically, the camera control unit 45 changes the zoom position in a direction indicated by the zoom request received from the operation input unit 44 at a standard changing speed. Then, the process proceeds to step ST23. FIG. 8 illustrates characteristics regarding how the zoom position is changed. In the case where the camera control unit 45 performs zoom driving control in the standard mode, the camera control unit 45 changes the zoom position in a direction indicated by the zoom request at a zoom position changing speed VA (equivalent to the standard changing speed).

In step ST23, the camera control unit 45 determines whether the zoom operation is terminated. If the camera control unit 45 determines that the operation of the zoom button 441 is continued, the process returns to step ST22. If the camera control unit 45 determines that the operation of the zoom button 441 is terminated, the camera control unit 45 ends zoom driving control.

When the process proceeds from step ST21 to step ST24, the camera control unit 45 performs zoom driving control in a single-step mode. Specifically, the camera control unit 45 changes the zoom position in a direction indicated by the zoom request received from the information processing apparatus 50 for a preset period, for example, at a low changing speed which is lower than the standard changing speed. The camera control unit 45 then ends zoom driving control. In the case where the camera control unit 45 performs zoom driving control in the single-step mode, the camera control unit 45 changes the zoom position in a direction indicated by the zoom request for a preset period, for example, at a zoom position changing speed VB which is lower than the zoom position changing speed VA illustrated in FIG. 8. Note that the zoom position may be changed at the standard changing speed in the single-step mode.

When the process proceeds from step ST21 to step ST25, the camera control unit 45 performs zoom driving control in a low-speed mode. Specifically, the camera control unit 45 changes the zoom position in a direction indicated by the zoom request received from the information processing apparatus 50, for example, at the low changing speed which is lower than the standard changing speed. Then, the process proceeds to step ST26. In the case where the camera control unit 45 performs zoom driving control in the low-speed mode, the camera control unit 45 changes the zoom position in a direction indicated by the zoom request, for example, at the zoom position changing speed VB.

In step ST26, the camera control unit 45 determines whether the zoom operation is terminated. If the camera control unit 45 determines that the wireless signal received from the information processing apparatus 50 indicates continuance of the zoom operation, the process returns to step ST25. If the camera control unit 45 determines that the wireless signal indicates termination of the zoom operation, the camera control unit 45 ends zoom driving control.

Figure 9:
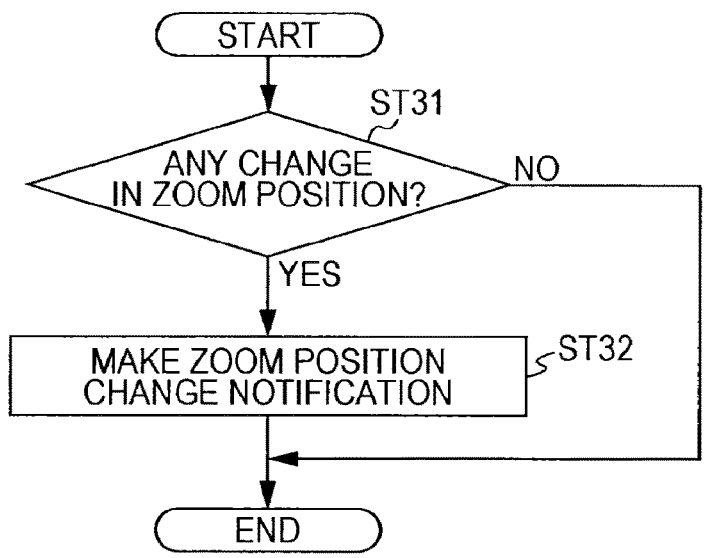
FIG. 9 is a flowchart illustrating a zoom position notification process.

The camera control unit 45 may also perform a zoom position notification process illustrated in FIG. 9 while performing zoom driving control in each of the standard mode, the single-step mode, and the low-speed mode, so as to notify the information processing apparatus 50 of the resulting zoom position set in the image capturing apparatus 20.

In step ST31, the camera control unit 45 determines whether the zoom position has changed. If the camera control unit 45 determines that the zoom position has changed, the process proceeds to step ST32. If not, the process ends.

In step ST32, the camera control unit 45 makes a zoom position change notification. Specifically, the camera control unit 45 transmits, as a wireless signal, zoom position change information indicating the resulting zoom position to the information processing apparatus 50 via Wi-Fi communication.

The configuration in which the image capturing apparatus 20 notifies the information processing apparatus 50 of the zoom position permits a user to confirm, using the information processing apparatus 50, the zoom position set in the image capturing apparatus 20 when operating the zoom of the image capturing apparatus 20 using the information processing apparatus 50. Note that the example illustrated in FIG. 7 includes the single-step mode in addition to the standard mode and the low-speed mode but the single-step mode may be omitted.

2-3. Zooming Control Action of Information Processing Apparatus

Figure 10:
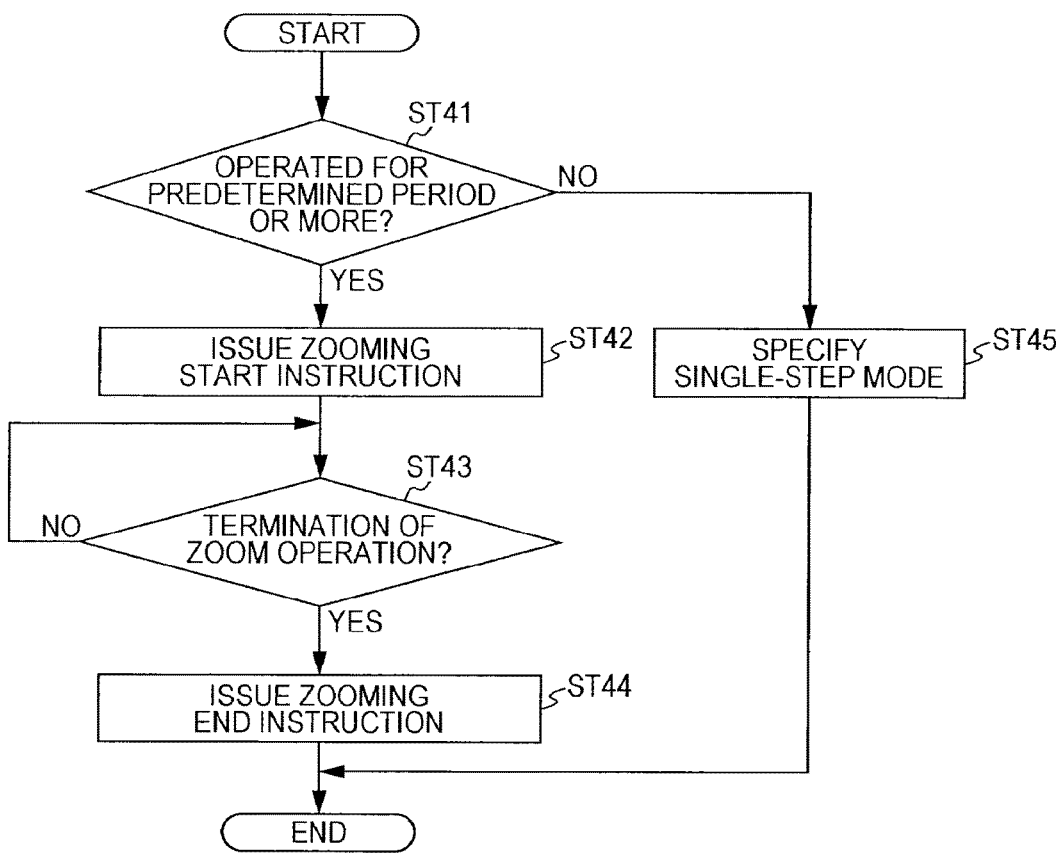
FIG. 10 is a flowchart illustrating an action performed by the information processing apparatus.

Next, a zooming control action performed by the information processing apparatus 50 will be described. FIG. 10 is a flowchart illustrating an action performed by the information processing apparatus 50. In the case where the cooperative function is enabled between the information processing apparatus 50 and the image capturing apparatus 20 and the information processing apparatus 50 controls the zooming action of the image capturing apparatus 20, the information processing apparatus 50 provides, for example, a GUI including an icon for changing the zoom position to the wide-angle side and an icon for changing the zoom position to a telephoto side on the screen of the display unit 67. Note that the icon for changing the zoom position to the wide-angle side is referred to as a wide-angle zoom button and the icon for changing the zoom position to the telephoto side is referred to as a telephoto zoom button. In the case where a zoom operation is performed using the wide-angle zoom button or telephoto zoom button, the information processing apparatus 50 performs a process starting from step ST41 so as to cause the image capturing apparatus 20 to perform zoom driving control.

In step ST41, the control unit 70 determines whether or not the zoom operation is continued for a predetermined period or longer. If the control unit 70 determines that operation of the wide-angle zoom button or the telephoto zoom button is continued for the predetermined period or longer, the process proceeds to step ST42. If the operation of the wide-angle zoom button or the telephoto zoom button is terminated before duration of the zoom button operation becomes the predetermined period or longer, the process proceeds to step ST45. For example, if the wide-angle zoom button or the telephoto zoom button is operated for a period shorter than the predetermined period (hereinafter, this operation is referred to as a "touch operation"), the process proceeds to step ST45. If the wide-angle zoom button or the telephoto zoom button is operated for the predetermined period or longer (hereinafter, this operation is referred to as a "push operation"), the process proceeds to step ST42.

In step ST42, the control unit 70 issues a zooming start instruction. Specifically, the control unit 70 determines which of the wide-angle zoom button and the telephoto zoom button is being operated, and generates a zoom control signal for starting zoom driving control for changing the zoom position to the direction corresponding to the operated zoom button. The control unit 70 outputs the generated zoom control signal to the Wi-Fi communication unit 613 of the wireless communication unit 61. The zoom control signal is transmitted from the Wi-Fi antenna 614 to the image capturing apparatus 20. The process then proceeds to step ST43.

In step ST43, the control unit 70 determines whether the zoom operation is terminated. If the control unit 70 determines that the zoom operation using the wide-angle zoom button or the telephoto zoom button is terminated, the process proceeds to step ST44. If the control unit 70 determines that the zoom operation is continued, the process returns to step ST43.

In step ST44, the control unit 70 issues a zooming end instruction. Specifically, the control unit 70 generates a zoom control signal for ending zoom driving control for changing the zoom position. The control unit 70 outputs the generated zoom control signal to the Wi-Fi communication unit 613 of the wireless communication unit 61. The zoom control signal is transmitted from the Wi-Fi antenna 614 to the image capturing apparatus 20. The process then ends.

When the process proceeds from step ST41 to step ST45, the control unit 70 specifies the single-step mode. Specifically, the control unit 70 generates a zoom control signal which triggers zoom driving control in the single-step mode, in which zoom driving control is performed for a preset period. The control unit 70 outputs the generated zoom control signal to the Wi-Fi communication unit 613 of the wireless communication unit 61. The zoom control signal is transmitted from the Wi-Fi antenna 614 to the image capturing apparatus 20. The process then ends.

In this way, the control unit 70 generates a zoom control signal that triggers control of the zooming action performed by the image capturing apparatus 20, in accordance with the operation position and duration of the zoom operation, and transmits the generated zoom control signal to the image capturing apparatus 20.

Figure 11:
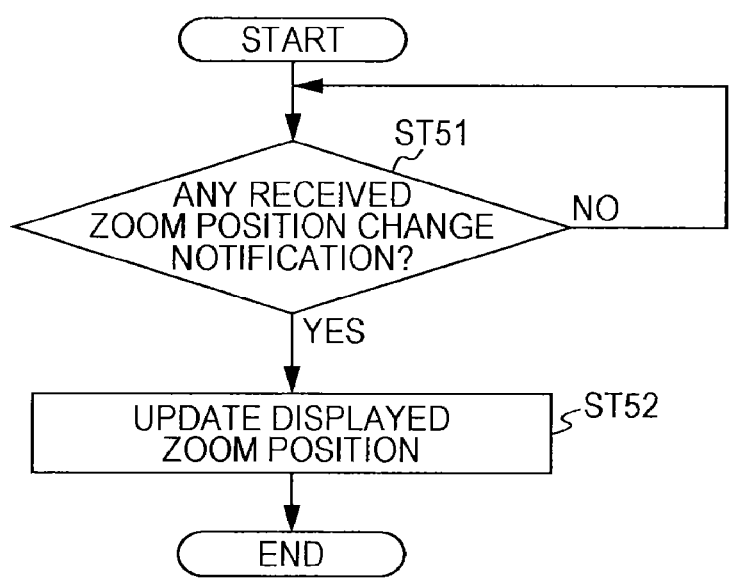
FIG. 11 is a flowchart illustrating a zoom position display process.

In the case where the image capturing apparatus 20 makes a zoom position change notification, the control unit 70 performs a zoom position display process illustrated in FIG. 11.

In step ST51, the control unit 70 determines whether the zoom position change information has been received. If the control unit 70 determines that a wireless signal representing the zoom position change information has not been received from the image capturing apparatus 20, the process returns to step ST51. If the control unit 70 determines that a wireless signal representing the zoom position change information has been received, the process proceeds to step ST52.

In step ST52, the control unit 70 updates the displayed zoom position. Specifically, the control unit 70 changes, for example, the zoom position on a zoom bar displayed on the screen of the display unit 67 to the notified zoom position, and then terminates the process.

Figure 12:
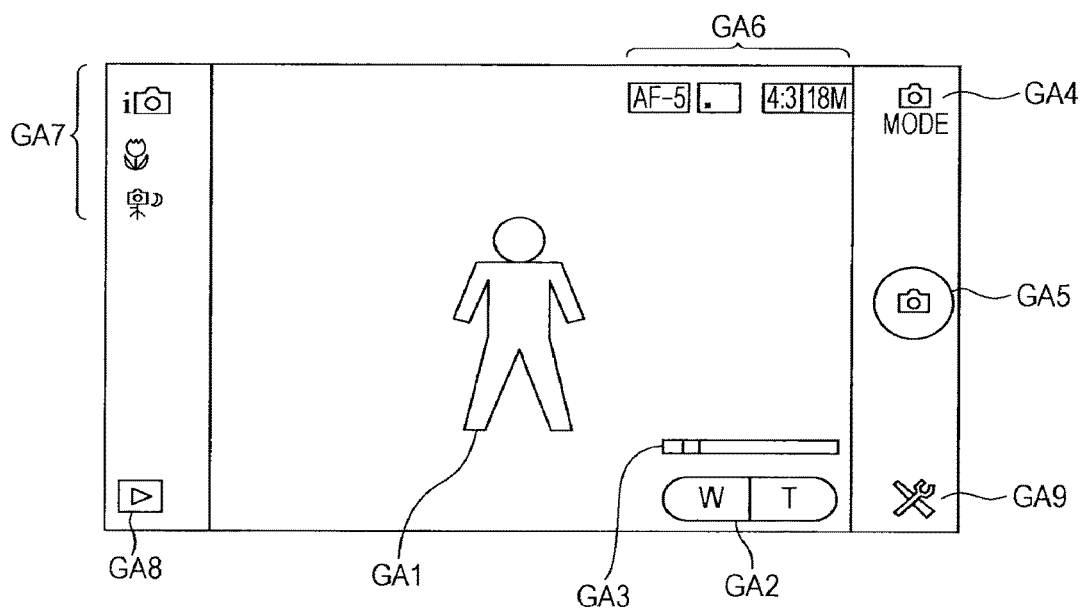
FIG. 12 is a diagram illustrating a screen displayed on a display unit of the information processing apparatus.

FIG. 12 illustrates the screen displayed on the display unit 67 of the information processing apparatus 50. Note that FIG. 12 illustrates the screen displayed when the cooperative function is enabled between the information processing apparatus 50 and the image capturing apparatus 20, for example.

An image GA1 is, for example, a camera-through image being captured by the image capturing apparatus 20, a recorded still image, a movie being recorded, or a reproduced still image or movie. An image GA2 is a zoom button and includes the wide-angle zoom button (W) and the telephoto zoom button (T). An image GA3 is a zoom bar indicating the zoom position. An image GA4 is an image capturing mode switch button for selecting a still image capturing mode or a movie capturing mode. An image GA5 is a shutter button and thus is an operation button for capturing a still image and for starting and stopping recording of a movie. Images GA6 are information icons indicating whether the recording medium 46 is inserted and the recording mode used to record captured images on the recording medium 46. Images GA7 are image capturing mode icons indicating the image capturing mode. An image GA8 is a playback button for reproducing a recorded still image or movie. An image GA9 is a setup button used to make various settings of the image capturing apparatus 20.

When changing the zoom position set in the image capturing apparatus 20 to the wide-angle side or the telephoto side, the user touches or pushes the zoom button represented by the image GA2. Upon detecting a touch operation or push operation in a display area of the image DA2, the control unit 70 determines a direction in which the zoom position is to be changed on the basis of which of the wide-angle side (W) and the telephoto side (T) of the zoom button has been operated. Also, the control unit 70 transmits a zoom control signal containing information indicating the determined zoom position changing direction to the image capturing apparatus 20 via Wi-Fi communication. In the case of a touch operation, the control unit 70 generates a zoom control signal that triggers the single-step mode zoom driving control. In the case of a push operation, the control unit 70 generates a zoom control signal for starting the low-speed mode zoom driving control. Further, when detecting termination of the push operation, the control unit 70 generates a zoom control signal for ending the low-speed mode zoom driving control.

In the case where a cooperative function is enabled between the image capturing apparatus 20 and the information processing apparatus 50 and a zoom operation is performed in the information processing apparatus 50, the zoom position changing speed is set to be lower than that set when a zoom operation is performed in the image capturing apparatus 20. This makes it easier to change the zoom position to a desired position even if response to the zoom operation performed in the information processing apparatus 50 is slower than response to the zoom operation performed in the image capturing apparatus 20, because a distance over which the zoom position is moved over duration of the zoom operation becomes smaller. That is, the zoom position changing speed is switched between the one suitable for a zoom operation accepted by the operation input unit 44 and the one suitable for a zoom operation performed in an external apparatus. Because the zoom position changing speed may be switched between the one suitable for a zoom operation accepted by the operation input unit 44 and the one suitable for a zoom operation performed in an external apparatus in this way, a zooming action with excellent operability may be implemented both in the cases where the zoom operation is performed in the image capturing apparatus 20 and in the information processing apparatus 50. Note that this example includes the single-step mode in addition to the standard mode and the low-speed mode but the single-step mode may be omitted.

3. Other Actions of Image Capturing System 3-1. Other Actions of Image Capturing Apparatus In the image capturing apparatus 20 described above, the zoom position changing speed is preset to a constant speed. In the case where a zoom operation is performed in the information processing apparatus 50, the zooming action is performed at a constant speed that is lower than the speed used when a zoom operation is performed in the image capturing apparatus 20. For example, in the case where a zoom request is made using the zoom button 441 provided on the image capturing apparatus 20, the zoom position changing speed is set to the first zoom position changing speed VA. In the case where a zoom request is received from the information processing apparatus 50, the zoom position changing speed is set to the second zoom position changing speed VB lower than the first zoom position changing speed VA. However, the zoom position changing speed is not necessarily constant and may be changed during the zooming action. Also, when a zoom request is received from the information processing apparatus 50, the zoom position changing speed may be set to a speed higher than the first zoom position changing speed VA.

Next, a description will be given of an action of changing the zoom position changing speed during a zooming action in the case where a zoom operation is performed in the information processing apparatus 50, among other actions performed by the image capturing apparatus 20.

Figure 13:
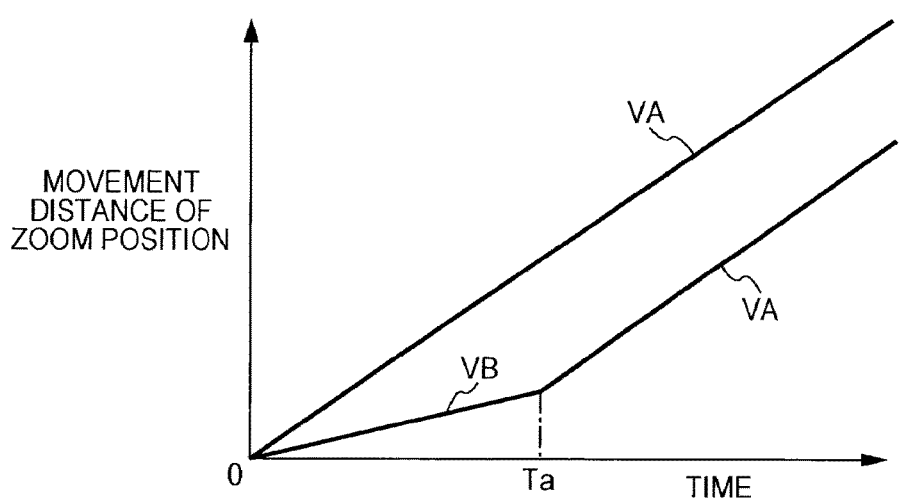
FIG. 13 is a diagram illustrating characteristics regarding how the zoom position is changed in another action.

FIG. 13 illustrates characteristics regarding how the zoom position is changed during another zooming action. FIG. 13 illustrates, for example, the case where the second zoom position changing speed VB is switched to the first zoom position changing speed VA on the basis of a zoom position changing period. In the case where a zoom request is received from the information processing apparatus 50, the camera control unit 45 of the image capturing apparatus 20 sets the second zoom position changing speed VB until a zoom position changing period (equivalent to duration of a push operation) reaches a period Ta, for example. If the zoom position changing period exceeds the period Ta, the camera control unit 45 performs control so as to change the zoom position at the first zoom position changing speed VA.

This configuration allows, in the case where a zoom operation is performed in the information processing apparatus 50, the zoom position to be gradually changed at the start of the zoom operation and also allows the zoom position to be changed at a high speed if the push operation is continued for a period longer than the period Ta. Therefore, in the case where the current zoom position is far from a desired zoom position, the zoom position may be efficiently changed to the desired zoom position.

In addition to changing the zoom position at a preset zoom position changing speed, the image capturing apparatus 20 may change the zoom position at a zoom position changing speed specified by the information processing apparatus 50. For example, in the case where the zoom position changing speed is specified by a zoom control signal received from the information processing apparatus 50, the image capturing apparatus 20 performs zoom driving control so as to change the zoom position at this specified zoom position changing speed. Alternatively, the image capturing apparatus 20 may change the zoom position to a zoom position specified by the information processing apparatus 50 at the preset zoom position changing speed or the zoom position changing speed specified by the information processing apparatus 50. For example, in the case where a target zoom position is specified by a zoom control signal received from the information processing apparatus 50, the image capturing apparatus 20 performs zoom driving control so as to change the zoom position to this specified zoom position. The configuration to perform such a zoom operation may implement various zooming actions, and thus may improve the operability.

3-2. Other Actions of Information Processing Apparatus

The information processing apparatus 50 described above specifies the single-step mode or issues a zoom driving control start instruction or a zoom driving control end instruction in response to operation of the zoom button. In addition to operation of the zoom button, the information processing apparatus 50 may trigger zoom driving control of the image capturing apparatus 20, in response to another user operation, for example, a pinch operation.

Figure 14:
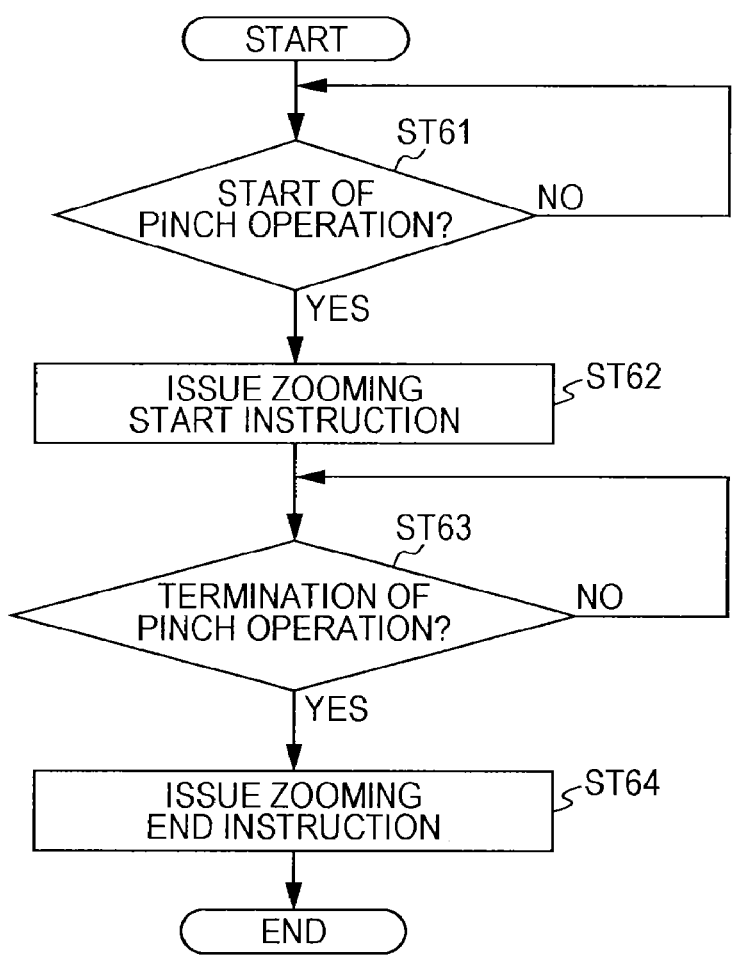
FIG. 14 is a flowchart illustrating an action performed in the case where zoom driving control is performed in accordance with duration of a pinch operation.

FIG. 14 is a flowchart illustrating an action performed by the information processing apparatus 50 in the case where zoom driving control is performed in accordance with duration of a pinch operation performed on the operation input unit 68 of the information processing apparatus 50.

In step ST61, the control unit 70 determines whether a pinch operation is started. If the control unit 70 determines on the basis of an operation signal supplied from the operation input unit 68 that a pinch operation is started, the process proceeds to step ST62. If not, the process returns to step ST61.

In step ST62, the control unit 70 issues a zooming start instruction. Specifically, the control unit 70 determines whether the pinch operation is a pinch-in operation or a pinch-out operation. The control unit 70 then generates a zoom control signal for starting changing the zoom position in a zoom direction based on the determined result. For example, in the case of a pinch-in operation, the zoom position is changed to the wide-angle side so that an image of a wider angle is to be captured. In the case of a pinch-out operation, the zoom position is changed to the telephoto side so that an enlarged image of a desired subject is to be captured. The control unit 70 outputs the generated zoom control signal to the Wi-Fi communication unit 613 of the wireless communication unit 61, and the zoom control signal is transmitted from the Wi-Fi antenna 614 to the image capturing apparatus 20. The process then proceeds to step ST63.

In step ST63, the control unit 70 determines whether the pinch operation is terminated. If the control unit 70 determines on the basis of an operation signal supplied from the operation input unit 68 that the pinch operation is terminated, the process proceeds to step ST64. If not, the process returns to step ST63.

In step ST64, the control unit 70 issues a zooming end instruction. Specifically, the control unit 70 generates a zoom control signal for ending changing of the zoom position. The control unit 70 outputs the generated zoom control signal to the Wi-Fi communication unit 613 of the wireless communication unit 61, and the zoom control signal is transmitted from the Wi-Fi antenna 614 to the image capturing apparatus 20. The process then ends.

By performing such a process, the information processing apparatus 50 allows the user to change the zoom position set in the image capturing apparatus 20 through a pinch operation in addition to operation of the zoom button. Furthermore, in the case where the pinch operation is performed over a certain distance at a low speed so as to make duration of the pinch operation longer in the process illustrated in FIG. 14, the zoom position changing period becomes longer and consequently the movement distance of the zoom position may become larger.

Figure 15:
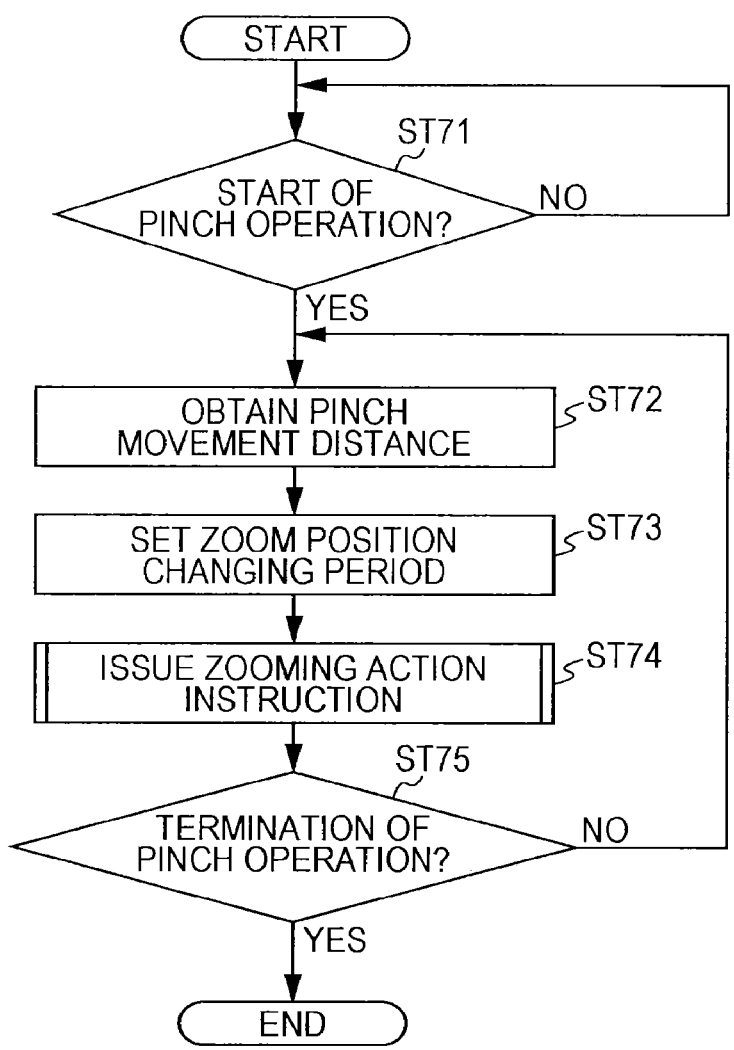
FIG. 15 is a flowchart illustrating an action performed in case where zoom driving control is performed in accordance with a movement distance of a pinch operation.

FIG. 15 is a flowchart illustrating an action performed by the information processing apparatus 50 in the case where zoom driving control is performed in accordance with the movement distance of a pinch operation performed on the operation input unit 68.

In step ST71, the control unit 70 determines whether a pinch operation is started. If the control unit 70 determines on the basis of an operation signal supplied from the operation input unit 68 that a pinch operation is started, the process proceeds to step ST72. If not, the process returns to step ST71.

In step ST72, the control unit 70 obtains a movement distance over which the operation position of the pinch operation has been moved (hereinafter, referred to as a pinch movement distance). Specifically, the control unit 70 obtains the pinch movement distance for a predetermined period on the basis of an operation signal supplied from the operation input unit 68. The process then proceeds to step ST73.

In step ST73, the control unit 70 sets the zoom position changing period in accordance with the pinch movement distance. The control unit 70 sets the zoom position changing period in accordance with the pinch movement distance such that the zoom position changing period becomes longer as the pinch movement distance becomes larger, for example. The process then proceeds to step ST74.

Figure 16:
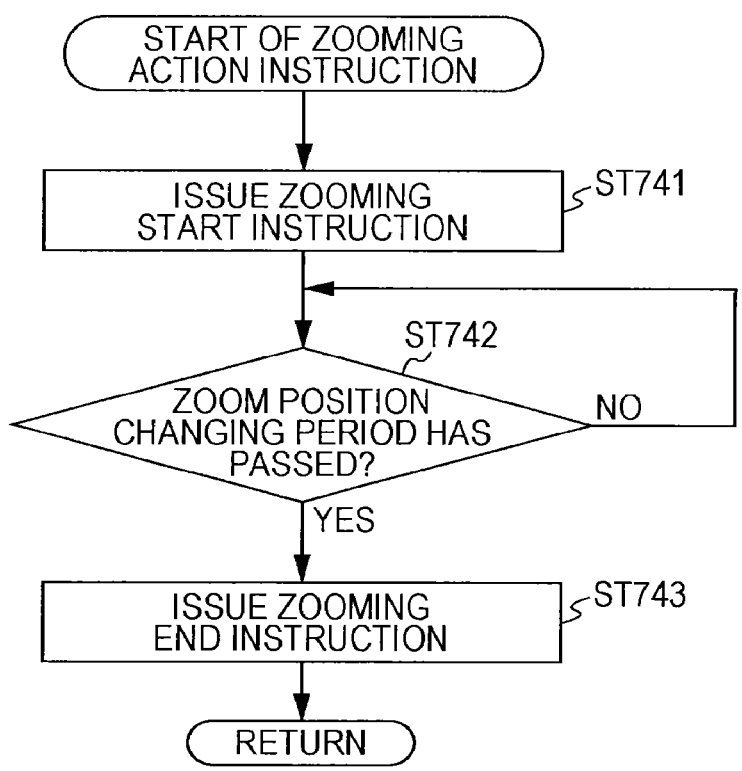
FIG. 16 is a flowchart illustrating how a zooming action instruction is made.

In step ST74, the control unit 70 makes a zooming action instruction. FIG. 16 is a flowchart illustrating how a zooming action instruction is made. In step ST741, the control unit 70 issues a zooming start instruction. Specifically, the control unit 70 determines whether the pinch operation is a pinch-in operation or a pinch-out operation, and generates a zoom control signal for starting changing of the zoom position in a zoom direction based on the determined result. For example, in the case of a pinch-in operation, the zoom position is changed to the wide-angle side so that an image of a wider angle is to be captured. In the case of a pinch-out operation, the zoom position is changed to the telephoto side so that an enlarged image of a desired subject is to be captured. The control unit 70 outputs the generated zoom control signal to the Wi-Fi communication unit 613 of the wireless communication unit 61, and the zoom control signal is transmitted from the Wi-Fi antenna 614 to the image capturing apparatus 20. The process then proceeds to step ST742.

In step ST742, the control unit 70 determines whether the zoom position changing period has passed. If the control unit 70 determines that the zoom position changing period set in step ST73 has not passed, the process returns to step S742.

If the control unit 70 determines that the zoom position changing period has passed, the process proceeds to step ST743.

In step ST743, the control unit 70 issues a zooming end instruction. Specifically, the control unit 70 generates a zoom control signal for ending changing of the zoom position. The control unit 70 outputs the generated zoom control signal to the Wi-Fi communication unit 613 of the wireless communication unit 61, and the zoom control signal is transmitted from the Wi-Fi antenna 614 to the image capturing apparatus 20. Then, the zooming action instruction procedure ends.

After the zooming action instruction procedure ends in the step ST74, the process proceeds to step ST75, in which the control unit 70 determines whether the pinch operation is terminated. If the control unit 70 determines on the basis of an operation signal supplied from the operation input unit 68 that the pinch operation is not terminated, the process returns to step ST72. If the control unit 70 determines that the pinch operation is terminated, the process ends.

By performing such a process, the information processing apparatus 50 allows the user to change the zoom position set in the image capturing apparatus 20 through a pinch operation in addition to operation of the zoom button. Furthermore, the zoom position changing period is set in accordance with the pinch movement distance. This configuration makes it easier for the user to adjust, by adjusting the pinch movement distance, the zoom position changing period set in the image capturing apparatus 20 and consequently the zoom movement distance.

Figure 17:
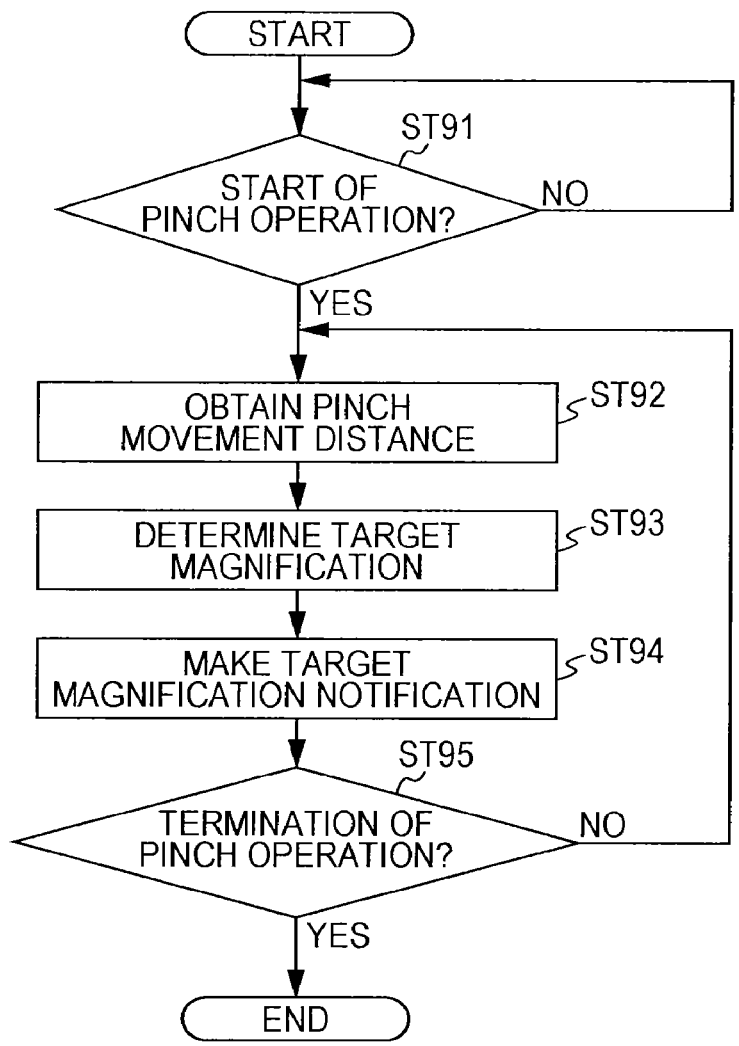
FIG. 17 is a flowchart illustrating an action performed in the case where zoom driving control is performed in accordance with a movement distance of a pinch operation and a current zoom magnification (zoom position).

FIG. 17 is a flowchart illustrating an action performed by the information processing apparatus 50 in the case where zoom driving control is performed in accordance with the pinch movement distance of a pinch operation performed on the operation input unit 68 of the information processing apparatus 50 and the current zoom magnification (zoom position).

In step ST91, the control unit 70 determines whether a pinch operation is started. If the control unit 70 determines on the basis of an operation signal supplied from the operation input unit 68 that a pinch operation is performed, the process proceeds to step ST92. If not, the process returns to step ST91.

In step ST92, the control unit 70 obtains the pinch movement distance. Specifically, the control unit 70 obtains the pinch movement distance for a predetermined period on the basis of an operation signal supplied from the operation input unit 68. The process then proceeds to step ST93.

In step ST93, the control unit 70 determines a target magnification (target zoom position). Specifically, the control unit 70 calculates the target magnification on the basis of the pinch movement distance obtained in step ST92 and the current zoom position (current magnification) which the control unit 70 is notified of by the image capturing apparatus 20. The process then proceeds to ST94. For example, in the case of a pinch-in operation, the control unit 70 determines the target magnification that is on the wide-angle side on the basis of the pinch movement distance and the current magnification so that an image of a wider angle is to be captured. For example, in the case of a pinch-out operation, the control unit 70 determines the target magnification that is on the telephoto side on the basis of the pinch movement distance and the current magnification so that an enlarged image of a desired subject is to be captured.

In step ST94, the control unit 70 makes a target magnification notification. Specifically, the control unit 70 generates a zoom control signal indicating the target magnification determined in step ST93. The control unit 70 outputs the generated zoom control signal to the Wi-Fi communication unit 613 of the wireless communication unit 61, and the zoom control signal is transmitted from the Wi-Fi antenna 614 to the image capturing apparatus 20. The process then proceeds to step ST95.

In step ST95, the control unit 70 determines whether the pinch operation is terminated on the basis of an operation signal supplied from the operation input unit 68. If the control unit 70 determines that the pinch operation is not terminated, the process returns to step ST92. If the control unit 70 determines that the pinch operation is terminated, the process ends.

By performing such a process, the information processing apparatus 50 allows the user to change the zoom position set in the image capturing apparatus 20 through a pinch operation in addition to operation of the zoom button. Also, by performing the process illustrated in FIG. 17, zoom driving control may be performed so that an image of the target magnification is to be captured.

The image capturing apparatus 20 may change the zoom position at a zoom position changing speed specified by the information processing apparatus 50 in addition to the zoom position changing speed based on information held therein. The zoom position changing speed specified by the information processing apparatus 50 may be higher than that set for a zooming action performed in response to a zoom operation on the operation input unit 44 (a zooming action in the standard mode). In this case, the information processing apparatus 50 determines the zoom position changing speed in accordance with the user operation, and notifies the image capturing apparatus 20 of the determined zoom position changing speed. For example, when determining the zoom position changing speed in accordance with a pinch operation, the control unit 70 sets the zoom position changing speed in accordance with the pinch movement distance for a predetermined period. Specifically, the zoom position changing speed is set to become higher as the pinch movement distance for a predetermined period becomes larger. This configuration allows the user to change the zoom position at a desired speed. Alternatively, the zoom position changing speed may be set to become higher than the zoom position changing speed VA as the pinch movement distance for the predetermined period becomes larger. This configuration allows the user to change the zoom position at a speed higher than that set in the case where the zoom button 441 of the image capturing apparatus 20 is operated. In the case where the image capturing apparatus 20 changes the zoom position at the zoom position changing speed specified by the information processing apparatus 50, the image capturing apparatus 20 may no longer hold information of the zoom position changing speed used for a zooming action performed in response to a zoom control signal received from the information processing apparatus 50.

The series of processes described in this specification can be executed by hardware, software, or a composite configuration of both. If the series of processes is to be executed by software, the series of processes can be executed by installing a program recording the processing sequence into a memory in a computer embedded in dedicated hardware. Alternatively, the series of processes can be executed by installing the program into a general-purpose computer capable of executing various processes.

For example, the program can be pre-recorded on a recording medium, such as a hard disk, a solid state drive (SSD), or a ROM. Alternatively, the program can be stored (recorded) temporarily or permanently on a removable recording medium, such as a flexible disk, a compact disc read only memory (CD-ROM), a magneto-optical (MO) disk, a digital versatile disc (DVD), a Blu-ray disc (registered trademark), a magnetic disk, or a semiconductor memory card. Such a removable recording medium can be provided as so-called packaged software.

In addition to being installed into a computer from a removable recording medium, the program may be transferred to the computer in a wireless or wired manner from a download site via a network, such as a local area network (LAN) or the Internet. The computer can receive the program thus transferred and install the program into a built-in recording medium, such as a hard disk.

The present technology is not to be construed as being limited to the embodiments of the technology described above. The embodiments of the technology disclose the present technology merely as an example, and it is obvious that a person skilled in the art can make various modifications to and substitutions for the embodiments without departing from the scope of the present technology. That is, the scope of the present technology is to be determined with reference to the appended claims.

A lens control apparatus according to an embodiment of the present technology can also be configured as follows.

(1) A lens control apparatus including:
an operation input unit configured to accept a user operation;
a communication unit configured to perform communication with an external apparatus; and
a control unit configured to perform driving control of a zoom lens in response to a zoom operation accepted by the operation input unit or a zoom control signal received by the communication unit and configured to selectively set a zoom position changing speed for driving control performed in response to the zoom operation and a zoom position changing speed for driving control performed in response to the zoom control signal, the zoom position changing speeds being different from each other.

(2) The lens control apparatus according to (1), wherein the control unit sets the zoom position changing speed for driving control performed in response to the zoom control signal to be lower than that for driving control performed in response to the zoom operation.

(3) The lens control apparatus according to Claim (2), wherein the control unit sets, when starting driving control of the zoom lens, the zoom position changing speed for driving control performed in response to the zoom control signal to be lower than that for driving control performed in response to the zoom operation, and later changes the zoom position changing speed to the zoom position changing speed for driving control performed in response to the zoom operation.

(4) The lens control apparatus according to any of (1) to (3), wherein in a case where the zoom control signal indicates that a zoom operation has been performed in the external apparatus over a period shorter than a predetermined period, the control unit performs driving control over a preset period.

(5) The lens control apparatus according to any of (1) to (4), wherein the control unit changes a zoom position of the zoom lens to a target zoom position indicated by the zoom control signal.

(6) The lens control apparatus according to any of (1) to (5), wherein the control unit changes a zoom position of the zoom lens at a zoom position changing speed indicated by the zoom control signal.

(7) The lens control apparatus according to any of (1) to (6), wherein the communication unit transmits information indicating a zoom position of the zoom lens to the external apparatus.

(8) The lens control apparatus according to any of (1) to (7), wherein the communication unit performs communication with the external apparatus wirelessly.

It should be understood by those skilled in the art that various modifications, combinations, sub-combinations and alterations may occur depending on design requirements and other factors insofar as they are within the scope of the appended claims or the equivalents thereof.

What is claimed is:

1. A camera comprising:
an operation input that receives a local zoom operation from the camera;
a wireless communicator that performs wireless communication with a portable external apparatus having a touch panel so as to receive a zoom control signal from the portable external apparatus via a network, the zoom control signal being generated based on a remote zoom operation on a control graphical user interface displayed on the touch panel of the portable external apparatus; and
circuitry that performs drive control of a zoom lens in accordance with the local zoom operation or the zoom control signal,
wherein the local zoom operation is one of a consecutive zoom operation or a single-step zoom operation, and
wherein a first zoom position changing speed based on the local zoom operation from the camera is always faster than a second zoom position changing speed based on the remote zoom operation on the control graphical user interface displayed on the touch panel of the portable external apparatus, the first zoom position changing speed being a standard changing speed when driving control of the zoom lens is performed in a standard mode instead of a low-speed mode, the standard changing speed being faster than a changing speed of the low-speed mode.

2. The camera according to claim 1, wherein a first zoom button and a second zoom button are displayed on the control graphical user interface.

3. The camera according to claim 2, wherein the first zoom button is a wide-angle zoom button and the second zoom button is a telephoto zoom button.

4. The camera according to claim 1, wherein a zoom indicator is displayed on a display of the camera.

5. The camera according to claim 4, wherein the zoom indicator is a zoom bar indicating a zoom position of the zoom lens.

6. The camera according to claim 1, wherein the local zoom operation corresponds to the consecutive zoom operation when the local zoom operation is detected for a predetermined period of time or longer, and the local zoom operation corresponds to the single-step zoom operation when the local zoom operation is detected for less than the predetermined period of time.

7. The camera according to claim 6, wherein the circuitry performs the drive control of the zoom lens based on the consecutive zoom operation when the local zoom operation is detected for the predetermined period of time or longer, and performs the drive control of the zoom lens based on the single-step zoom operation when the local zoom operation is detected for less than the predetermined period of time.

8. The camera according to claim 1, wherein a first zoom position change time from a zoom start position to a zoom end position based on the zoom control signal is longer than a second zoom position change time from the zoom start position to the zoom end position based on the local zoom operation.

9. The camera according to claim 8, wherein the first zoom position change time from the zoom start position to the zoom end position based on the zoom control signal is not adjustable by a user.

10. The camera according to claim 8, wherein the circuitry sets the first zoom position change time for the drive control of the zoom lens based on the zoom control signal to be longer than the second zoom position change time for the drive control of the zoom lens based on the local zoom operation.

11. The camera according to claim 1, wherein the circuitry changes a zoom position of the zoom lens at the first zoom position changing speed based on the local zoom operation, and changes the zoom position of the zoom lens at the second zoom position changing speed based on the zoom control signal.

12. The camera according to claim 1, wherein the wireless communicator transmits information indicating a zoom position of the zoom lens to the portable external apparatus.

13. The camera according to claim 1, wherein the second zoom position changing speed is adjustable.

14. A method comprising:
  receiving a local zoom operation from a camera;
  performing, by a wireless communicator, wireless communication with a portable external apparatus having a touch panel so as to receive a zoom control signal from the portable external apparatus via a network, the zoom control signal being generated based on a remote zoom operation on a control graphical user interface displayed on the touch panel of the portable external apparatus; and
  performing, by circuitry, drive control of a zoom lens in accordance with the local zoom operation or the zoom control signal,
  wherein the local zoom operation is one of a consecutive zoom operation or a single-step zoom operation, and
  wherein a first zoom position changing speed based on the local zoom operation from the camera is always faster than a second zoom position changing speed based on the remote zoom operation on the control graphical user interface displayed on the touch panel of the portable external apparatus, the first zoom position changing speed being a standard changing speed when driving control of the zoom lens is performed in a standard mode instead of a low-speed mode, the standard changing speed being faster than a changing speed of the low-speed mode.

15. The method according to claim 14, wherein a first zoom button and a second zoom button are displayed on the control graphical user interface.

16. The method according to claim 15, wherein the first zoom button is a wide-angle zoom button and the second zoom button is a telephoto zoom button.

17. The method according to claim 14, further comprising:
  displaying a zoom indicator on a display.

18. The method according to claim 17, wherein the zoom indicator is a zoom bar indicating a zoom position of the zoom lens.

19. The method according to claim 14, further comprising:
  setting, by the circuitry, a first zoom position change time for the drive control of the zoom lens based on the zoom control signal to be longer than a second zoom position change time for the drive control of the zoom lens based on the local zoom operation.

20. A non-transitory computer-reasonable storage medium including computer-readable instructions that, when executed by a computer, cause the computer to execute a method comprising:
  receiving a local zoom operation from a camera;
  performing wireless communication with a portable external apparatus having a touch panel so as to receive a zoom control signal from the portable external apparatus via a network, the zoom control signal being generated based on a remote zoom operation on a control graphical user interface displayed on the touch panel of the portable external apparatus; and
  performing drive control of a zoom lens in accordance with the local zoom operation or the zoom control signal,
  wherein the local zoom operation is one of a consecutive zoom operation or a single-step zoom operation, and
  wherein a first zoom position changing speed based on the local zoom operation from camera is always faster than a second zoom position changing speed based on the remote zoom operation on the control graphical user interface displayed on the touch panel of the portable external apparatus, the first zoom position changing speed being a standard changing speed when driving control of the zoom lens is performed in a standard mode instead of a low-speed mode, the standard changing speed being faster than a changing speed of the low-speed mode.

* * * * *